(12) United States Patent
Uchida et al.

(10) Patent No.: US 8,021,061 B2
(45) Date of Patent: Sep. 20, 2011

(54) LENS BARRIER DEVICE

(75) Inventors: Noboru Uchida, Yokohama (JP);
Shigeru Yokota, Yokohama (JP);
Masahiro Yamamoto, Yokohama (JP)

(73) Assignee: Victor Company of Japan, Limited,
Yokohama-Shi (JP)

( * ) Notice: Subject to any disclaimer, the term of this patent is extended or adjusted under 35 U.S.C. 154(b) by 0 days.

(21) Appl. No.: 12/868,143

(22) Filed: Aug. 25, 2010

(65) Prior Publication Data
US 2011/0052182 A1    Mar. 3, 2011

(30) Foreign Application Priority Data

Aug. 28, 2009  (JP) ................. P2009-197716

(51) Int. Cl.
*G03B 17/00* (2006.01)
(52) U.S. Cl. ........................................ 396/448
(58) Field of Classification Search .......... 396/448; 359/507
See application file for complete search history.

(56) References Cited

U.S. PATENT DOCUMENTS 5,614,973 A * 3/1997 Azegami ............... 396/448
2010/0067896 A1 * 3/2010 Murakami ............. 396/448

FOREIGN PATENT DOCUMENTS

JP  2007-322872  12/2007

* cited by examiner

*Primary Examiner* — Chrisotpher Mahoney
(74) *Attorney, Agent, or Firm* — The Nath Law Group; Jerald L. Meyer; Derek Richmond

(57) ABSTRACT

A lens barrier device 10 includes a pair of lens barrier members 12, 12 having a pair of toggle-lever engagement bosses 12e, 12e, a ring 14 having a pair of recesses 14d, 14d formed on its outer circumferential part, a pair of toggle levers 15, 15 having a pair of triangular cam part 15d, 15d and a base frame 17 supporting the toggle levers 15, 15, and a pair of torsion springs 16, 16 engaged with the toggle levers 15, 15 and the base frame 17. In assembling, the toggle-lever engagement bosses 12e, 12e are freely fitted into the recesses 14d, 14d, respectively. With forward-reverse rotating of the ring 14, by allowing the toggle-lever engagement bosses 12e, 12e to slide along the triangular cam part 15d, 15d while pressing the bosses 12e, 12e through respective ends of the recesses 14d, 14d, the pair of lens barrier members 12, 12 are held in their closed or opened condition by the toggle levers 15, 15 and the torsion springs 16, 16.

8 Claims, 15 Drawing Sheets

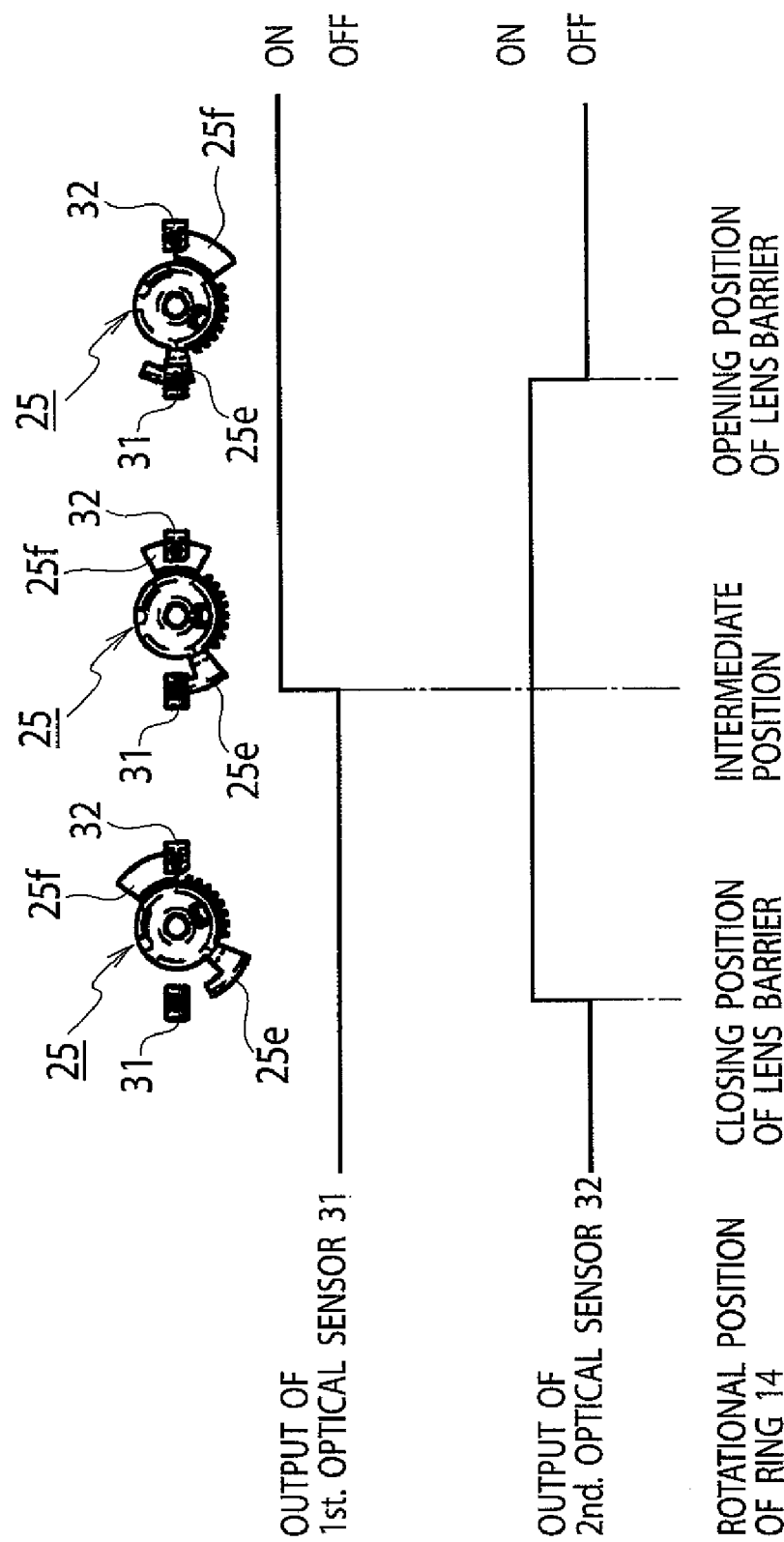

LENS BARRIER DEVICE

BACKGROUND OF THE INVENTION

1. Field of the Invention

The present invention relates to a lens barrier device that can securely open and close a pair of lens barrier members for protecting an imaging lens when opening and closing these lens barrier members in association with a forward/reverse rotatable ring provided with no cam groove for opening and closing the lens barrier members.

2. Description of Related Art

On the front side of an imaging device, such as camera or video camera, generally, a lens barrier device is attached to protect an imaging lens of the device from damage.

In the lens barrier device of this type, there exist a wide variety of structural forms in the art. By way of example, there is a lens barrier device disclosed in Japanese Patent Publication Laid-open No. 2007-322872.

This lens barrier device includes a pair of lens barrier members for protecting an imaging lens and an operating ring capable of forward and reverse rotations. The pair of lens barrier members are formed with a pair of engagement pins, while the operating ring is formed with a pair of cam grooves for engagement with the engagement pins of the barrier members. In operation, when opening or closing the pair of lens barrier members, the operational ring is forward-reverse rotated in a predetermined angular range under condition that the pair of engagement pins of the members are engaged with the cam grooves respectively. Between a lens-barrier support frame and the operating ring, a toggle spring is provided to urge the operating ring toward its lens-barrier closing and opening positions with "click" feeling, presenting comfortable maneuvering feeling.

SUMMARY OF THE INVENTION

With the forward-reverse rotation of the operating ring, the above-mentioned lens barrier device of the above-described Patent Document is constructed so as to enable a pair of lens barrier members to be closed or opened in accordance with the profile of the cam grooves since the pair of engagement pins are engaged with the pair of cam grooves of the operating ring. However, due to dimensional variations of the cam grooves, there is a possibility that the pair of lens barrier members are closed or opened imperfectly.

In addition, as the above-mentioned lens barrier device is adapted so as to open or close the lens barrier members by forward-reverse rotating the operating ring manually, it is impossible to respond the demands of opening/closing a pair of lens barrier members automatically.

In a situation that an operator (e.g. photographer) must take a picture of a subject even when the lens barrier device has a breakdown for any reason, additionally, it is impossible for the operator to manually open the lens barrier members forcibly due to the profile of the cam grooves. That is, the above-mentioned lens barrier device is incapable of emergency response.

Different from the above-mentioned lens barrier device of the above-described Patent Document, there is also proposed another lens barrier device enabling one pair of lens barrier members to be opened manually and forcibly, although this lens barrier device is not shown in the figures. In this lens barrier device, however, since the lens barrier members are generally urged in their closed direction (i.e. direction to close up an light through-hole) by a pair of springs, it is impossible to maintain the lens barrier members being opened by urging force of the springs, disabling the lens barrier device for emergency response.

Under the above-mentioned situation, an object of the present invention is to provide a lens barrier device capable of certainly opening and closing a pair of lens barrier members for protecting an imaging lens when opening/closing them in association with a forward-reverse rotatable ring without forming a cam groove in the ring for opening/closing the lens barrier members, improving both quality and reliability of the lens barrier device. In addition, another object of the present invention is to provide a lens barrier device capable of opening and closing a pair of lens barrier members certainly even when the device has a breakdown for any reason.

In order to achieve the above objects, according to the present invention, there is provided a lens barrier device for protecting an imaging lens from damage, comprising: a pair of lens barrier members each having a first shaft hole formed therein, a blade part formed on one side of the first shaft hole and a toggle-lever engagement boss formed on the other side of the first shaft hole; a lens-barrier support frame arranged adjacent to the pair of lens barrier members, the lens-barrier support frame having a first light through-hole defined therein and also supporting the pair of lens barrier members rotatably about the first shaft holes so that the first light through-hole is opened and closed up by the pair of lens barrier members; a ring arranged adjacent to the lens-barrier support frame, the ring having an outer circumferential part, a second light through-hole defined therein and a pair of recesses formed on the outer circumferential part so as to interpose the second light through-hole therebetween, the ring allowing the toggle-lever engagement bosses of the lens barrier members to be freely fitted into the recesses; a pair of toggle levers each having a second shaft hole formed therein and a triangular cam part formed on one side of the second shaft hole to allow the toggle-lever engagement bosses freely-fitted into the recesses to slide on the triangular cam part; a base frame arranged adjacent to the ring to have an outer circumferential part and a third light through-hole defined therein, the base frame supporting the ring so as to be forward-reverse rotatable between a first predetermined rotational position where the lens barrier members close up the first light through-hole and a second predetermined rotational position where the lens barrier members open the first light through-hole and also rotatably supporting the pair of toggle levers on the outer circumferential part's surface opposed to the ring so that the third light through-hole is interposed between the pair of toggle levers; and a pair of springs mounted on the outer circumferential part of the base frame and engaged with the pair of toggle levers respectively to urge them against the third light through-hole, wherein the lens-barrier support frame, the ring and the base frame are arranged so that the first light through-hole, the second light through-hole and the third light through-hole are aligned with each other, and the sliding movement of the toggle-lever engagement bosses on the triangular cam part while being pressed by respective ends of the recesses, which movement is caused by forward-reverse rotating the ring between the first predetermined rotational position and the second predetermined rotational position, allows the pair of lens barrier members to remain either closed or opened by the pair of toggle levers and the pair of springs.

BRIEF DESCRIPTION OF THE DRAWINGS

FIGS. 1A to 1C are views illustrating a video camera equipped with a lens barrier device according to the present invention, in which FIG. 1A illustrates a condition that a pair of lens barrier members are brought into their closed position, FIG. 1B a condition that the lens barrier members are brought into their closed position and FIG. 1C illustrates a whole constitution of the video camera;

FIGS. 3A to 3D are views for explanation of a main lens-barrier member of the lens barrier member of the lens barrier device of the present invention, in which FIG. 3A is a side view of the main lens-barrier member, FIG. 3B a plan view thereof, FIG. 3C a plan view showing upper and lower main lens-barrier members in pairs and FIG. 3D is a cross sectional view of a part D of FIG. 3C;

FIGS. 4A to 4C are views for explanation of a sub lens-barrier member of the lens barrier member of the lens barrier device of the present invention, in which FIG. 4A is a side view of the sub lens-barrier member, FIG. 4B a plan view thereof and FIG. 4C a plan view showing upper and lower sub lens-barrier members in pairs;

FIGS. 5A and 5B are enlarged plan views showing a condition that the pair of sub lens-barrier members are mounted on the pair of main lens-barrier members in the lens barrier device of the present invention, in which FIG. 5A illustrates the lens barrier members being closed and FIG. 5B illustrates the lend barrier members being opened;

FIG. 10 is a diagram typically showing the rotational position of a ring when first and second optical sensors attached to the box part of the base frame are detected by first and second optical-sensor shielding parts formed in the toothless gear for ring drive of the lens barrier device of the present invention;

FIGS. 12A and 12B are views showing the condition where the lens barrier members are closed and the ring is standing by at its intermediate position, in which FIG. 12A shows an operation of opening the lens barrier members manually and FIG. 12B shows an operation of rotating the lens barrier members to their opened position automatically;

FIGS. 16A and 16B are views showing the condition where the lens barrier members are closed and the ring is standing by at its intermediate position, in which FIG. 16A shows an operation of opening the lens barrier members manually and FIG. 16B shows an operation of automatically rotating the ring in a direction to close the lens barrier members.

DETAILED DESCRIPTION OF PREFERRED EMBODIMENT

Referring to FIGS. 1 to 17B, one embodiment of a lens barrier device of the present invention will be described below.

Embodiment

Figure 1C:
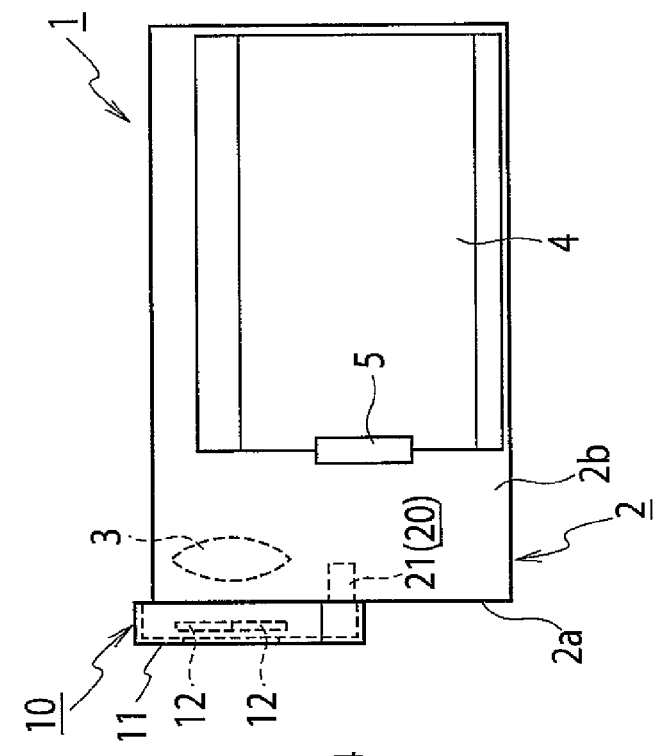
Figure 1B:
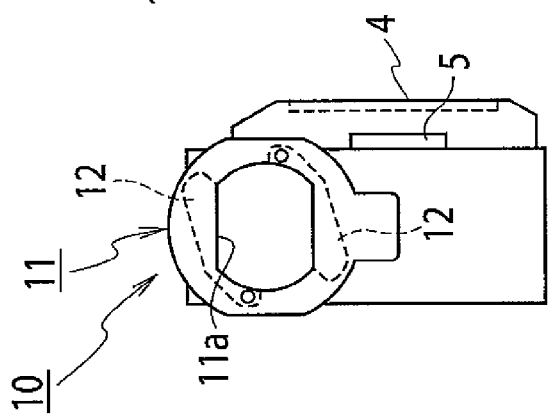
Figure 1A:
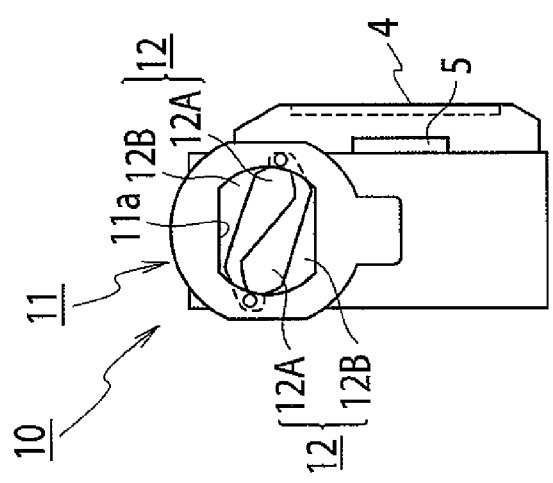

As shown in FIGS. 1A to 1C, a lens barrier device 10 related to the present invention is provided to protect an imaging lens 3 in a camera casing 2 of a video camera 1. More specifically, the lens barrier device 10 is attached to the side of a front face 2a of the camera casing 2 so as to be aligned with an optical axis of an imaging lens 3. Further, attached on a side face 2b of the camera casing 2 is a liquid crystal panel part 4 that displays a subject image picked up by the imaging lens 3 and reproduced images. The liquid crystal panel part 4 is attached to the camera casing 2 through a hinge 5 in an openable-and-closable manner.

In this embodiment, the lens barrier device 10 is attached to the video camera 1. Without being limited to this embodiment only, however, the lens barrier may be attached to not-shown camera, lens unit and so on.

The above-mentioned lens barrier device 10 is provided, on the backside of a front cover frame 11, with a pair of upper and lower lens barrier members 12, 12 opposing to each other, which are openable and closeable vertically.

The upper lens barrier member 12 comprises the same components as those of the lower lens barrier member 12. The components constituting the upper lens barrier member 12 are opposed to those constituting the lower lens barrier member 12 symmetrically up and down. That is, the upper and lower lens barrier members 12, 12 comprise a pair of upper and lower main lens-barrier members 12A, 12A and a pair of upper and lower sub lens-barrier members 12B, 12B mounted on the main lens-barrier members 12A, 12A and also operated in association with them. In this way, the upper and lower lens barrier members 12, 12 are constructed by four blades in the shown embodiment.

In one modification, the upper and lower lens barrier members 12, 12 may be constructed by two blades that are obtained by integrating the sub lens-barrier members into the main lens-barrier members respectively.

In operation, as shown in FIG. 1A, when a rectangular-shaped light through-hole 11a formed in the front cover frame 11 is closed by the lens barrier members 12, 12 in pairs, it is completed to protect the imaging lens 3 in the camera casing 2 of the video camera 1.

On the other hand, as shown in FIG. 1B, when a user opens the liquid crystal panel part 4 to take a picture of the subject and then, a not-shown sensor detects that the liquid crystal panel part 4 has been opened, a DC motor 21 of a ring drive mechanism 20 in the lens barrier device 10 is operated to pivot the lens barrier members 12, 12 automatically. Consequently, the light through-hole 11a in the front cover frame 11 is opened to enable a picture of the subject to be taken.

The whole structure of the lens barrier device 10 of the present invention will be described with reference to FIG. 2, below.

Figure 2:
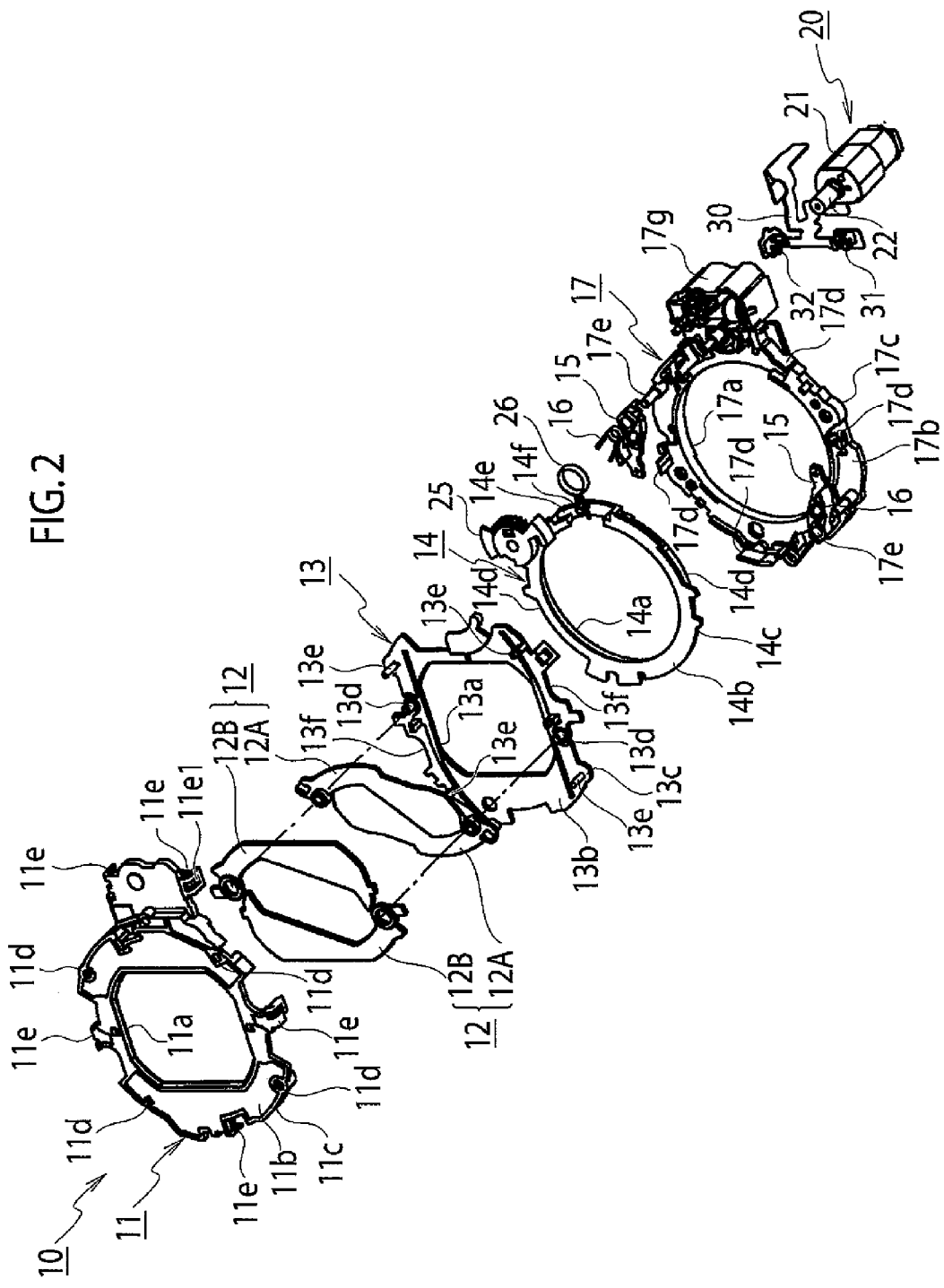
FIG. 2 is an exploded perspective view of the lens barrier device of the present invention.

As shown in FIG. 2 in an exploded state, the lens barrier device 10 of the invention comprises, in order of extending from the subject toward the camera casing 2 (FIGS. 1A, 1B and 1C), the front cover frame 11, the pair of lens barrier members 12, 12 (12A, 12B), a lens-barrier support frame 13 for supporting the lens barrier members 12, 12 in their openable and closeable manner, a ring 14, a pair of toggle levers 15, 15, a pair of torsion springs 16, 16 for urging the toggle levers 15, 15, and a base frame 17 for supporting the toggle levers 15, 15 on an outer circumferential surface opposed to the ring 14 rotatably while allowing the torsion springs 16, 16 to urge the toggle levers 15, 15. Note that the forward-reverse rotation of the ring 14 is performed while allowing a pair of toggle-lever engagement bosses 12e, 12e (FIG. 3A) formed on the lens barrier members 12, 12 to be freely fitted in a pair of recesses 14d, 14d on the outer circumferential part of the ring 14. The ring 14 is adapted so as to be forward-reverse rotatable within a predetermined angular range between a first predetermined rotational position (i.e. lens-barrier closing position) where the lens barrier members 12, 12 are rotated to close up the light through-hole 11a and a second predetermined rotational position (i.e. lens-barrier opening position) where the lens barrier members 12, 12 are rotated to open the light through-hole 11a. Further, with forward-reverse rotating of the ring 14, the toggle levers 15, 15 are adapted so as to allow the toggle-lever engagement bosses 12e, 12e to slide thereon while being pushed by respective.

In assembling, firstly, the lens-barrier support frame 13 supporting the pair of lens barrier members 12, 12 is secured on a rear face 11c of the front cover frame 11. Then, the lens barrier device 10 is assembled by attaching the front cover frame 11 to the base frame 17 detachably while interposing the ring 14 between the lens-barrier support frame 13 and the base frame 17 so as to enable forward-reverse rotation.

More specifically, the front cover frame 11 is a single-piece component molded with use of black resinous material. In the front cover frame 11, the rectangular-shaped light through-hole 11a is formed at a substantial center of the frame 11 to penetrate it between the front face 11b and the rear face 11c. The light through-hole 11a is formed with an axis aligned with an optical axis of the imaging lens 3 (FIG. 1C). Also, the front cover frame 11 has a plurality of circular holes 11d formed about the light through-hole 11a, for attachment with the lens-barrier support frame 13. In addition, at appropriate positions along a lateral face of the outer circumferential part of the cover 11, a plurality of attachment pieces 11e for attachment with the base frame are formed so as to project toward the base frame 17 and enable an elastic deformation. Each attachment piece 11e is provided with an engagement hole 11e1, although FIG. 2 illustrates only one hole 11e1. These attachment pieces 11e are capable of elastic deformation.

As mentioned before, the pair of lens barrier members 12, 12 comprise the main lens-barrier members 12A, 12A in pairs and the sub lens-barrier members 12B, 12B in parts, providing a four-blade constitution.

Figure 3A:
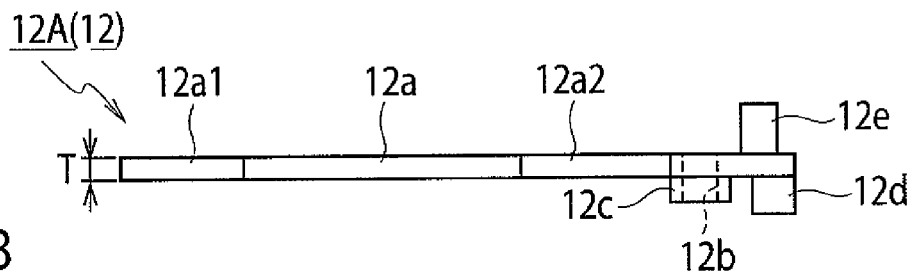
Figure 3B:
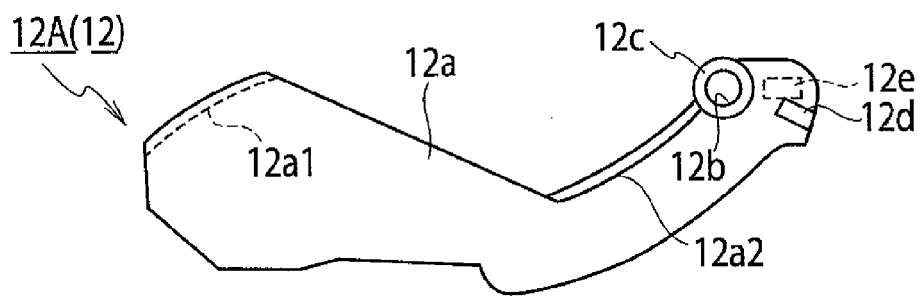

As shown in FIGS. 3A and 3B in enlargement, the main lens-barrier member 12A is also a single-piece component molded with use of black resinous material. The main lens-barrier member 12A has a blade part 12a formed on one side with a thickness T. At a base portion of the blade part 12a of the main lens-barrier member 12A, a boss 12c for supporting the sub lens barrier and a projecting piece 12d for stopper are formed so as to project toward the front side of the camera. In addition, on the opposite side of the projecting piece 12d, a toggle-lever engagement boss 12e essential to this embodiment is formed so as to project toward the rear side of the camera.

In the main lens-barrier member 12A, the blade part 12a has an abutting part formed in the form of a substantial triangular wave. The abutting part comprises a first tapered surface 12a1 formed on a left frontal end face to face rearward side and a second tapered surface 12a2 formed on a right frontal end face to face forward.

Figure 3C:
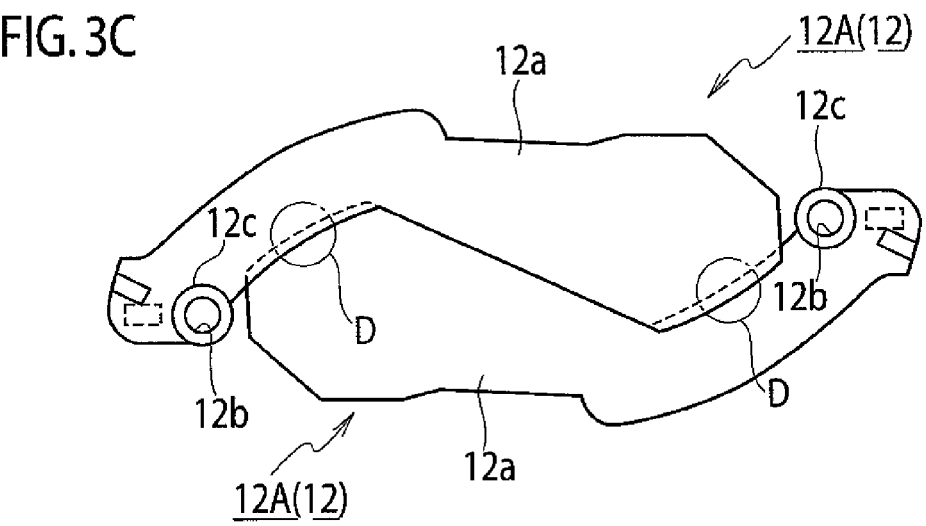

FIG. 3C shows an arrangement of the main lens-barrier members 12A, 12A in their assembled state (closing state), which can be obtained by turning around one of two main lens-barrier members 12A, 12A, which have been molded with use of an identical die, and successively allowing the one member 12A to be opposed to the other member 12A. That is, as the above-mentioned main lens-barrier members 12A, 12A constituting the lens barrier device of the invention comprise two pieces of identical components, the resultant lens barrier device 10 can be manufactured at low cost.

Figure 3D:
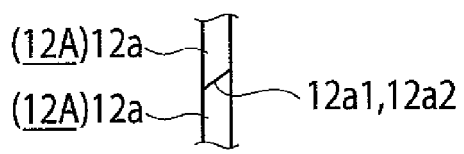

In connection, the first tapered surface 12a1 of one main lens-barrier member 12A and the second tapered surface 12a2 of the other main lens-barrier member 12A are laid to overlap each other when allowing both abutting parts of these members 12A, 12A to be opposed to each other, as shown in FIGS. 3C and 3D. Therefore, even when the upper and lower main lens-barrier members 12A, 12A are engaged with each other as shown in FIG. 3C, there is no possibility of causing light leakage and invasion of dust or the like.

Figure 4A:
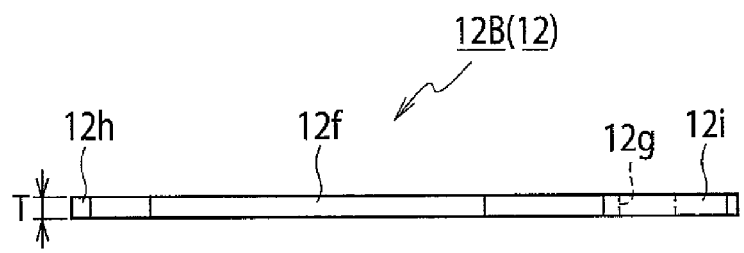
Figure 4B:
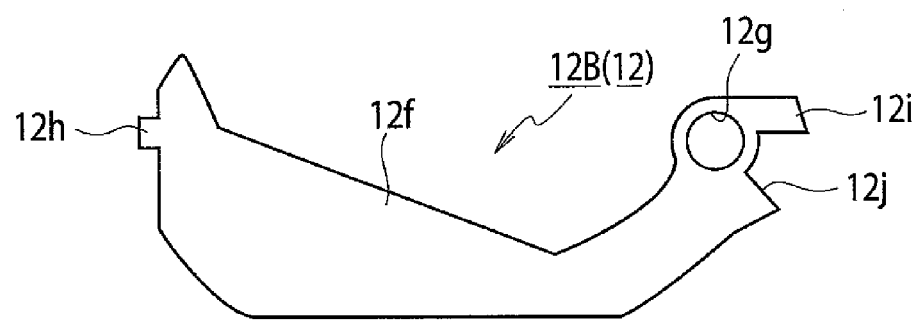

As shown in FIGS. 4A and 4B in enlargement, the sub lens-barrier member 12B is also a single-piece component molded with use of black resinous material. The sub lens-barrier member 12B has a blade part 12f formed on one side with a thickness T. At a base portion of the blade part 12f, the sub lens-barrier member 12B has a shaft hole 12g formed for its rotational engagement with the boss 12c (FIGS. 3A, 3B and 3C) for supporting the sub lens barrier of the main lens-barrier member 12A.

In addition, the sub lens-barrier member 12B has a stopper piece 12h formed so as to project from one end of the blade part 12f. On the other hand, the sub lens-barrier member 12B has another stopper piece 12i and a recess 12j both formed around the shaft hole 12g. In assembling, the projecting piece 12d for stopper (FIG. 3A) of the main lens-barrier member 12A is received in the recess 12j, allowing the sub lens-barrier member 12B to be activated (i.e. opened and closed) in association with the main lens-barrier member 12A.

Figure 4C:
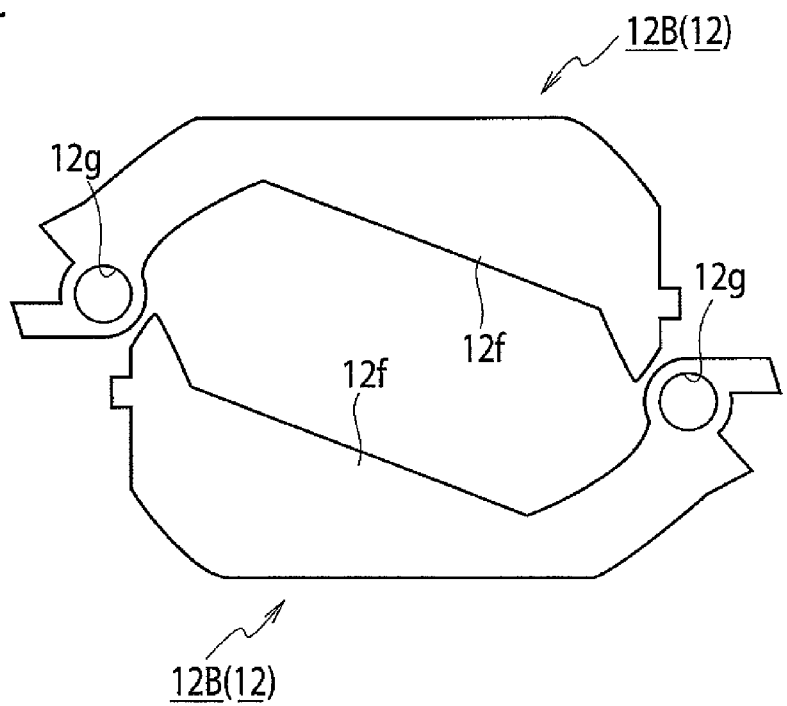

FIG. 4C shows an arrangement of the sub lens-barrier members 12B, 12B in their assembled state, which can be obtained by turning around one of two sub lens-barrier members 12B, 12B, which have been molded with use of an identical die, and successively allowing the one member 12B to be opposed to the other member 12B. That is, as the above-mentioned sub lens-barrier members 12B, 12B also comprise two pieces of identical components, the resultant lens barrier device 10 can be manufactured at low cost.

Figure 5A:
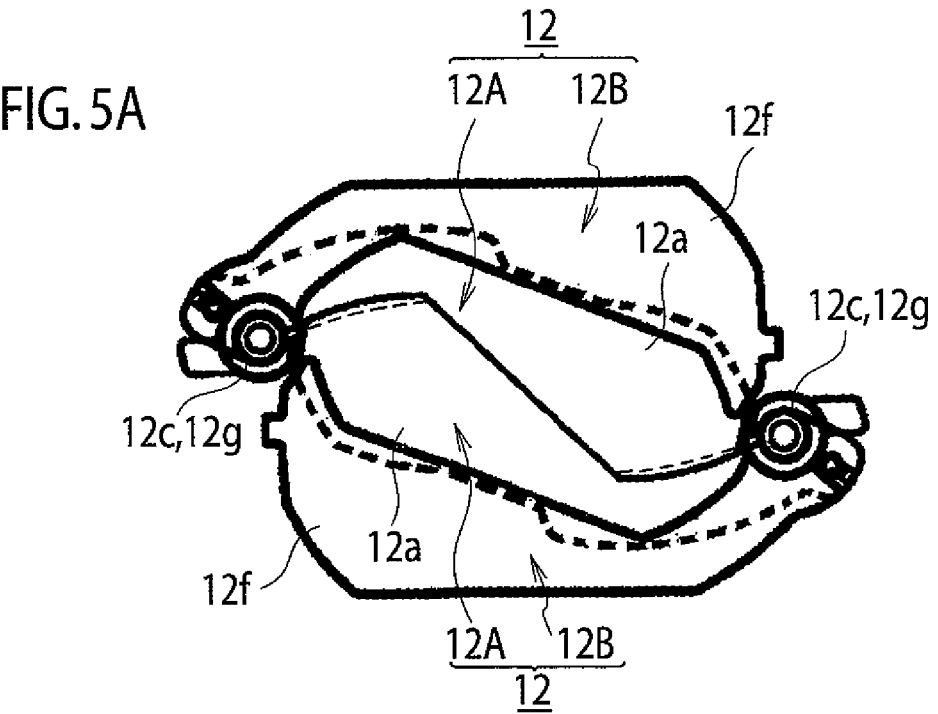

In order to realize the upper and lower main lens-barrier members 12A, 12A being activated to close up the light through-hole 11a, as shown in FIG. 5A, the bosses 12c, 12c of the main lens-barrier members 12A, 12A are fitted into the shaft holes 12g, 12g formed in the sub lens-barrier members 12B, 12B while confronting the blade parts 12a, 12a of the main lens-barrier members 12A, 12A with each other. Subsequently, the blade parts 12f of each sub lens-barrier member 12B is arranged so as to partially overlap the blade part 12a of each main lens-barrier member 12A, whereby the above-mentioned closing condition can be accomplished.

Figure 5B:
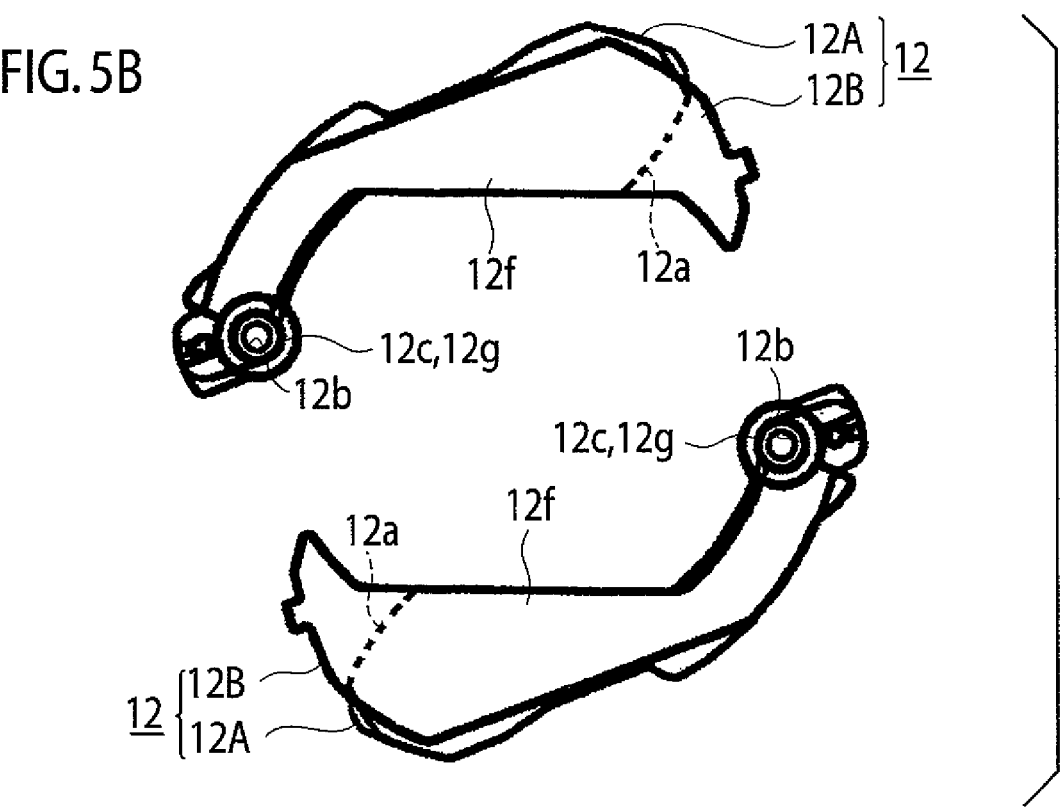

In order to realize the upper and lower main lens-barrier members 12A, 12A being activated to open the light through-hole 11a, as shown in FIG. 5B, the main lens-barrier members 12A, 12A are rotated about the respective shaft holes 12b, 12b as the rotation centers. Then, the rotation of the main lens-barrier members 12A, 12A causes each sub lens-barrier member 12B to be rotated about the boss 12c. Consequently, the blade parts 12f of each sub lens-barrier member 12B and the blade part 12a of each main lens-barrier member 12A are laid to overlap each other, whereby the above-mentioned opening condition can be accomplished.

Referring to FIG. 2 again, the lens-barrier support frame 13 is also formed by a single-piece component molded with use of black resinous material. In the lens-barrier support frame 13, a rectangular-shaped light through-hole 13a is formed at a substantial center of the frame 13 to penetrate it between a front face 13b and a rear face 13c. The light through-hole 13a is also formed with an axis aligned with the optical axis of the imaging lens 3 (FIG. 1C). Also, the lens-barrier support frame 13 has a pair of barrier support shafts 13d, 13d formed on the front face 13b to engage with the shaft holes 12b, 12b of the main lens-barrier members 12A, 12A, thereby rotatably supporting them. In addition, along the outer circumferential part of the frame 13, a plurality of attachment bosses 13e are formed so as to project from the front face 13b. In the assembled state, these attachment bosses 13e are fitted into the circular holes 11d of the front cover frame 11.

Further, the lens-barrier support frame 13 has a pair of recesses 13f, 13f formed on both sides of the outer circumferential part. In assembling, the pair of toggle-lever engagement bosses 12e formed on the main lens-barrier members 12A, 12A are received in the recesses 13f, 13f, respectively.

As mentioned above, the main lens-barrier members 12A, 12A are respectively formed with the shaft holes 12b, 12b, while the lens-barrier support frame 13 is formed with the pair of barrier support shafts 13d, 13d for engagement with the shaft holes 12b, 12b in the illustrated embodiment. In one modification, however, the lens-barrier support frame 13 may be provided with respective shaft holes corresponding to the shaft holes 12b on condition of providing the main lens-barrier members 12A, 12A with respective shafts corresponding to the support shafts 13d, 13d.

Further, the lens-barrier support frame 13 may be shaped so as to narrow a dimension between both sides of the outer circumferential part in lieu of the recesses 13f, 13f, so that the toggle-lever engagement bosses 12e, 12e of the main lens-barrier members 12A, 12A can be engaged on the ring 14.

The ring 14 capable of forward-reverse rotation is also formed by a single-piece component made from black resinous material. In the ring 14, a circular light through-hole 14a is formed at a substantial center of the ring 14 to penetrate it between a front face 14b and a rear face 14c. The light through-hole 14a is also formed with an axis aligned with the optical axis of the imaging lens 3 (FIG. 1C). Also, the ring 14 has the pair of recesses 14d, 14d formed on both sides of the outer circumferential part to each expand along the circumferential direction of the ring 14 over a predetermined angular range. In the assembled state, as mentioned before, the pair of toggle-lever engagement bosses 12e, 12e formed on the main lens barrier members 12A, 12A are freely fitted in the pair of recesses 14d, 14d, respectively.

In the outer circumferential part of the ring 14, a stepped part 14e is formed between the pair of recesses 14d, 14d so as to be lower from the front face 14b. The stepped part 14e is formed, at a substantial center thereof, with a ring drive boss 14f projecting from the part 14e. In the assembled state, the ring driving boss 14f is engaged with a breeches torsion spring 26 hooked to a ring-drive toothless gear 25 in a later-mentioned ring drive mechanism 20.

Opposing to the lens-barrier support frame 13, the ring 14 is adapted so as to be forward-reverse rotatable between a late-mentioned lens-barrier closing position and a lens-barrier opening position.

The base frame 17 is also formed by a single-piece component made from black resinous material. In the frame 17, a circular light through-hole 17a is formed at a substantial center of the frame 17 to penetrate it between a front face 17b and a rear face 17c. The light through-hole 17a is also formed with an axis aligned with the optical axis of the imaging lens 3 (FIG. 1C). Also, the base frame 17 has a plurality of sidewall parts 17d formed along the outer circumferential part of the light through-hole 17a to project against the front cover frame 11. Each of the sidewall parts 17d is provided with an engagement projection (not shown) for engagement with the engagement hole 11e1 (FIG. 2) of the elastically-deformable attachment piece 11e of the front cover frame 11.

Figure 6:
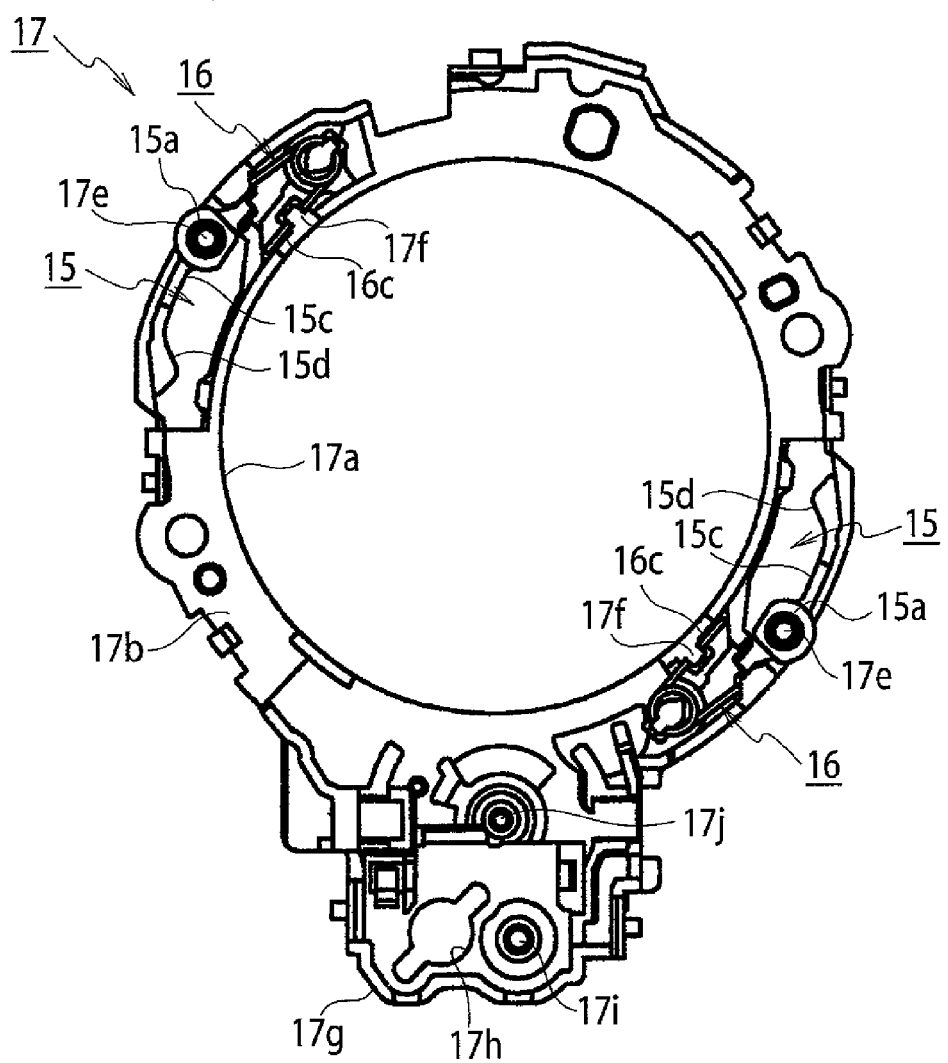
FIG. 6 is a plan view showing an arrangement of the lens barrier device of the present invention where a pair of toggle levers and a pair of torsion springs are attached on the outer circumferential part of a base frame symmetrically up and down.

As shown in FIG. 6 in enlargement, the base frame 17 has a pair of toggle-lever support shafts 17e, 17e formed on the outer circumferential part of the front face 17b so as to project against the ring 14 (FIG. 2) in the assembled state. In the assembled state, the toggle-lever support shafts 17e, 17e are fitted into a pair of shaft holes 15a, 15a formed in the pair of toggle levers 15, 15, while a pair of torsion springs 16, 16 urge the toggle levers 15, 15 against the light through-hole 17a.

As mentioned above, the toggle-lever support shafts 17e, 17e of the base frame 17 are rotatably fitted into the shaft holes 15a, 15a of the pair of toggle levers 15, 15 in the illustrated embodiment. In one modification, however, each of the toggle levers 15 may be provided with a support shaft corresponding to the support shaft 17e on condition of providing each base frame 17 with a boss having a shaft hole corresponding to the shaft hole 15a.

Figure 7:
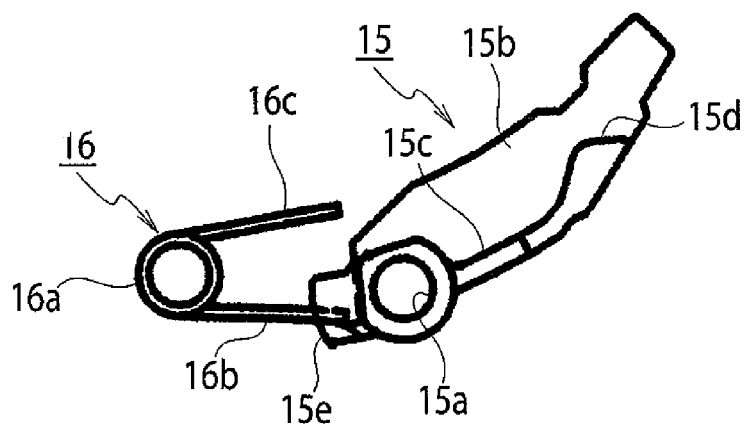
FIG. 7 is a plan view showing the toggle lever and the torsion spring of FIG. 6, in enlargement.

As shown in FIG. 7 in enlargement, the above-mentioned toggle lever 15 comprises a single-piece component manufactured with use of wear-resistant material, such as engineering plastic called "Delrin" (trademark). The toggle lever 15 includes a flattened lever part 15b having the shaft hole 15a on one side, a sidewall part 15c projecting from the shaft hole 15a along a side face of the lever part 15b and a triangular cam part 15d succeeding to the sidewall part 15c along the side face of the lever part 15 and also constituting an essential part of this embodiment. In the assembled state, the above-mentioned toggle-lever engagement boss 12e of the lens-barrier member 12A is adapted so as to be slidable on the triangular cam part 15d of the toggle lever 15.

On the opposite side of the lever part 15b over the shaft hole 15a, the toggle lever 15 has a spring hook part 15e formed to hook the torsion spring 16. As shown in FIG. 7, the torsion spring 16 comprises a ring part 16a and two extended ends 16b, 16c extending from the ring part 16a to provide the above-mentioned breeches torsion spring. In the assembled state, the extended end 16b of the torsion spring 16 is hooked up with the spring hook part 15e of the toggle lever 15, while the other extended end 16c is hooked up with a spring hook part 17f (FIG. 6) formed on the front face 17b of the base frame 17.

Then, the torsion spring 16 urges the lens barrier member 12 to its closing direction through the toggle lever 15 when the lens barrier member 12 is closed. While, when the lens barrier member 12 is opened, the torsion spring 16 urges the lens barrier member 12 to its opening direction through the toggle lever 15.

The pair of toggle levers 15, 15, which can be molded with use of an identical molding die, are arranged on the outer circumferential part of the front face 17b of the base frame 17 so as to be symmetrical to each other from side to side and up and down. Obviously from FIG. 6, the toggle levers 15, 15 are also opposed to each other. More specifically, each toggle lever 15 is arranged so as to direct the sidewall part 15c and the triangular cam part 15d toward the light through-hole 17a inside the base frame 17.

In the outer circumferential part of the base frame 17, a box part 17g is formed at a frame's region opposed to the stepped part 14e (FIG. 2) of the ring 14 in the assembled state. In the box part 17g, as shown in FIG. 6 in enlargement, a clearance through-hole 17h is formed so as to permit the passage of a later-mentioned motor worm and additionally, first and second gear support shafts 17i, 17j are arranged so as to stand upright separately from each other.

Figure 8:
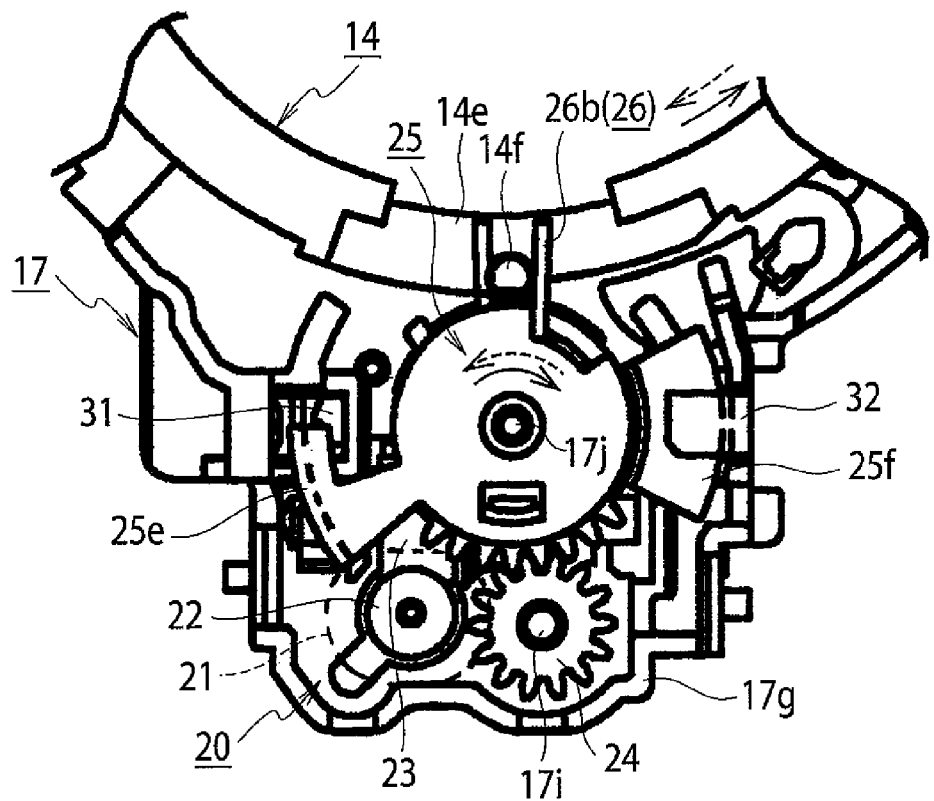
FIG. 8 is a plan view showing a ring drive mechanism attached to a box part of the base frame of the lens barrier device of the present invention, in enlargement.

As shown in FIG. 8 in enlargement, the box part 17g of the base frame 17 accommodates the ring drive mechanism 20 for forward-reverse rotating the ring 14 (FIG. 2) automatically.

The ring drive mechanism 20 includes a forward-reverse rotatable DC motor 21 attached on the backside of the box part 17g, a motor worm gear 22 secured to a motor shaft of the DC motor 21 and approaching to the interior of the box part 17g through the clearance through-hole 17h and first and second optical sensors 31, 32 soldered to a print circuit board 30 (FIG. 2) and approaching from the backside of the box part 17g into the interior.

In the box part 17g, a compound gear 23 having a spur gear and a worm gear integrated with each other from side to side is arranged in the vicinity of the motor worm gear 22 rotatably. One side of the worm gear of the compound gear 23, there is a two-stage spur gear 24 having a small-diameter spur gear and a large-diameter spur gear in lamination, which is supported by the first gear support shaft 17i rotatably. While, on the other side of the worm gear of the compound gear 23, the ring-drive toothless gear 25 is rotatably supported by the second gear support shaft 17j.

In the ring drive mechanism 20 constructed above, when rotating the motor worm gear 22 secured on the motor shaft of the DC motor 21 forward or in reverse, the rotation of the motor worm gear 22 is transmitted from the spur gear of the compound gear 23 meshing with the gear 22 to the worm gear of the compound gear 23. Then, the transmitted rotation of the worm gear is transmitted from the small-diameter spur gear of the two-stage spur gear 24 meshing with the worm gear to the large-diameter spur gear of the spur gear 24. Further, as the large-diameter spur gear of the spur gear 24 meshes with the ring-drive toothless gear 25, the rotation of the motor worm gear 22 is finally transmitted to the ring-drive toothless gear 25, so that it rotates within a predetermined angular range forward or in reverse. In this way, the above components 21 to 25 constitute a decelerating gear system of the invention.

It is noted that the decelerating gear system 21-25 in the ring drive mechanism 20 is nothing but one illustrative and explanatory example. In a modification, a geared motor (not shown) in lieu of the DC motor 21 may be used to drive the ring-drive toothless gear 25.

Figure 9:
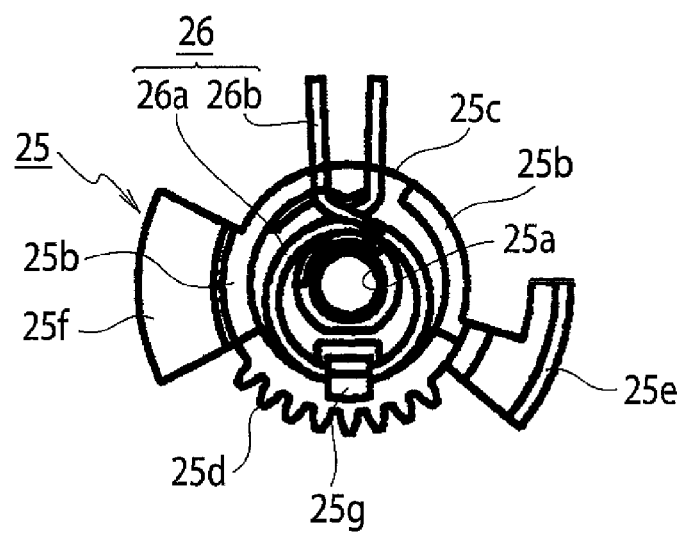
FIG. 9 is a plan view showing a toothless gear for ring drive of FIG. 8 and a bifurcated torsion spring engaged with the toothless gear, viewed from a backside thereof.

FIG. 9 shows the backside of the ring-drive toothless gear 25 in enlargement. As shown in FIG. 9, the ring-drive toothless gear 25 has a pair of peripheral walls 25b, 25b formed so as to project from an outer circumferential part 25c right and left, coaxially with the shaft hole 25a. In addition, the ring-drive toothless gear 25 has a toothless gear part 25d formed between the pair of peripheral walls 25b, 25b in a predetermined angular range. On either side of the toothless gear part 25d, furthermore, first and second optical-sensor shielding parts 25e, 25f are formed so as to project from the part 25d radially outward.

Inside the backside of the ring-drive toothless gear 25, a breeches torsion spring 26 is hooked on to the toothless gear part 25d so as to be forward-reverse rotatable together with the ring-drive toothless gear 25 integrally.

The breeches torsion spring 26 comprises a ring part 26a arranged along respective inner faces of the peripheral walls 25b, 25b and also hooked to a spring hook part 25g formed inside the toothless gear part 25d of the ring-drive toothless gear 25, and a pair of breeches parts 26b extending from the ring part 26a outward of the outer circumferential part 25c on the opposite side of the spring hook part 25g over the toothless gear part 25d and the shaft hole 25a.

In the assembled state, as shown in FIG. 8, the ring driving boss 14f projecting from the stepped part 14e of the ring 14 is engaged with the breeches parts 26b of the breeches torsion spring 26. Consequently, with the forward or reverse rotation of the ring-drive toothless gear 25 in a predetermined angular range, the ring 14 is rotated in a predetermined angular range, forward or in reverse.

Assume here that the ring 14 is directly driven in rotation by the ring-drive toothless gear 25. Then, due to inertia force of the decelerating gear system 21-25 (including the DC motor 21) during rotating of the ring-drive toothless gear 25, there is produced an over-stroke movement about the ring 14. On the contrary, according to the embodiment, as the breeches torsion spring 26 engaged with the ring-drive toothless gear 25 for its integral rotation is deflected, the rotation of the ring 14 while absorbing the above over-stroke movement is accomplished. Therefore, it is possible to forward-reverse rotate the ring 14 without any over-stroke movement and within the predetermined angular range, securely.

In addition, as the assembling of the ring drive mechanism 20 to the ring 14 is accomplished by engaging the ring driving boss 14f of the ring 14 with the breeches parts 26b of the breeches torsion spring 26 integrated with the ring-drive toothless gear 25 on the last stage of the decelerating gear system 21-25, there is produced no phase shifting between the ring 14 and the ring-drive toothless gear 25. That is, as the ring drive mechanism 20 is assembled to the ring 14 without aligning these components' orientations etc. precisely, the assemblability of the lens barrier device itself can be improved furthermore.

In the box part 17g of the base frame 17, the first and second optical sensors 31, 32 are detected by the first and second optical-sensor shielding parts 25e, 25f formed on the left and right side of the ring-drive toothless gear 25. Consequently, as shown in FIG. 10, by combining respective outputs from the sensors 31, 32 with each other, it is possible to detect the rotational position of the ring 14 when it is forward-reverse rotated in the predetermined angular range.

More specifically, when the first optical sensor 31 outputs a low-level (L) signal and the second optical sensor 32 outputs a high-level (H) signal, the ring 14 reaches the lens-barrier closing position to close up the upper and lower lens barrier members 12, 12. On the other hand, when the first optical sensor 31 outputs a H-level signal and the second optical sensor 32 outputs a L-level signal, the ring 14 reaches the lens-barrier opening position to open the upper and lower lens barrier members 12, 12. Further, when the first optical sensor 31 and the second optical sensor 32 together output a H-level signals, the ring 14 reaches an intermediate position between the lens-barrier closing position and the lens-barrier opening position. Note that this intermediate position is defined as a position through which the upper and lower lens barrier members 12, 12 pass on their way to the opening or closing position. Further, as mentioned later, this intermediate position also corresponds to a position where the ring 14 waits ready when the upper and lower lens barrier members 12, 12 are closed or opened completely.

The operation of the lens barrier device 10 of the present invention will be described in the order of events, with reference to FIGS. 11A to 17B.

Figure 11A:
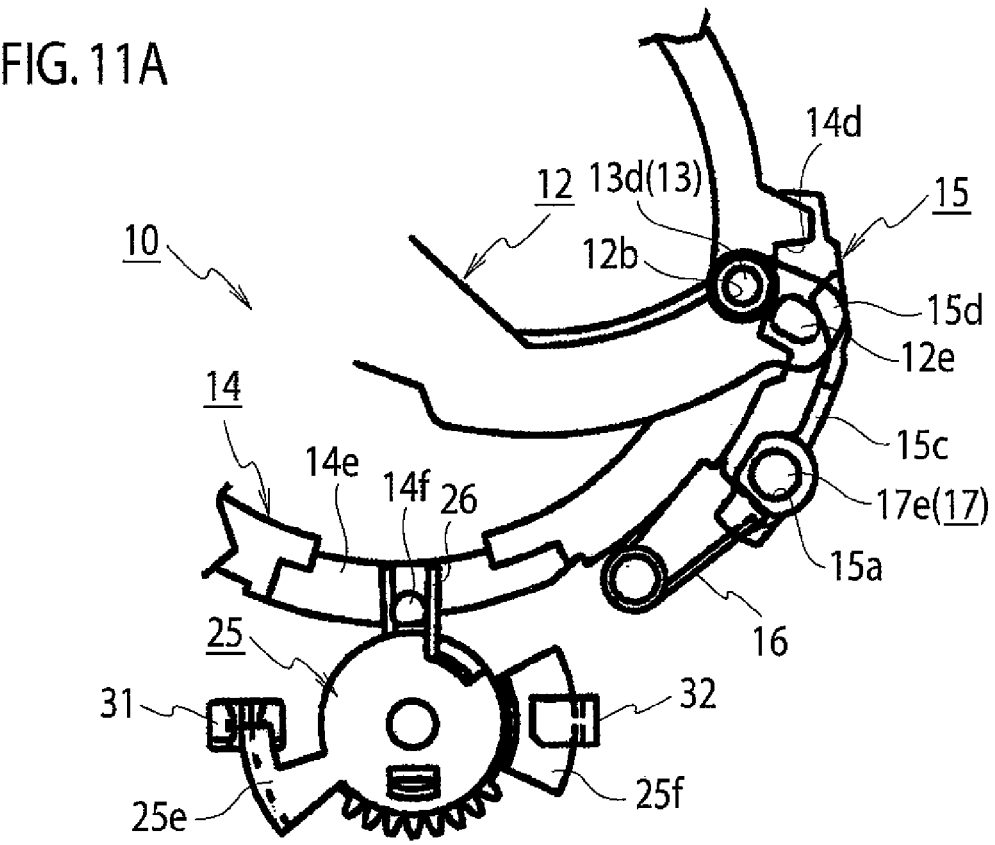
FIGS. 11A and 11B are views for explanation of the operation of the lens barrier device of the present invention, showing a condition where the lens barrier members are closed and the ring is standing by at its intermediate position.
Figure 11B:
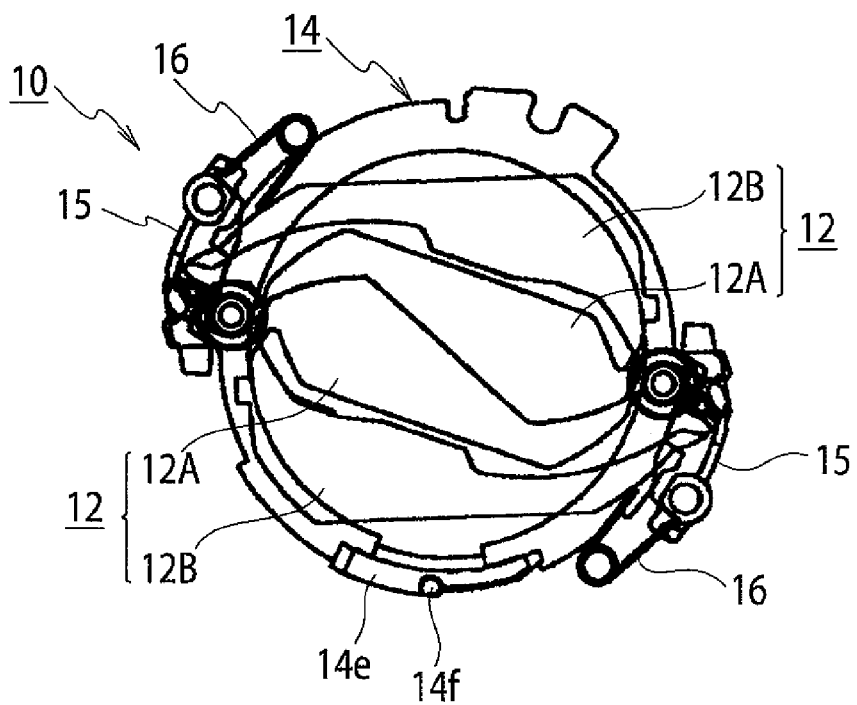

FIGS. 11A and 11B shows a condition where the lens barrier members 12, 12 are closed, while the ring 14 is stranding ready at the intermediate position. Therefore, this condition means that the lens barrier device 10 is held in its initial state during nonuse of the video camera 1 (FIG. 1).

As shown in FIG. 11A in enlargement, the lens barrier member 12 is rotatably supported by the barrier support shaft 13d of the lens-barrier support frame 13 through the shaft hole 12b, while the toggle lever 15 is rotatably supported by the toggle-lever support shaft 17e of the base frame 17 through the shaft hole 15a. In this state, the toggle-lever engagement boss 12e of the lens-barrier member 12 comes in contact with one slope of the triangular cam part 15d on the side of the sidewall part 15c, so that the lens-barrier member 12 is urged to the closing direction by the torsion spring 16 through the toggle lever 15.

On the other hand, in the ring-drive toothless gear 25, the first and second optical-sensor shielding parts 25e, 25f block off the first and second optical sensors 31, 32 respectively, while the breeches torsion spring 26 is engaged with the ring driving boss 14f at the center of the stepped part 14e of the ring 14. Nevertheless, as the ring-drive toothless gear 25 is in the resting state, the ring 14 is stopped to stand ready at the intermediate position between the lens-barrier closing position and the lens-barrier opening position.

Then, the toggle-lever engagement boss 12e of the lens-barrier member 12 comes close to one end of the recess 14d of the ring 14, which is closer to the ring driving boss 14f than the other end of the recess 14d. Simultaneously, the toggle-lever engagement boss 12e is also allowed to move from the one end of the recess 14d to the other end on the opposite side.

Thus, as shown in FIG. 11B, the upper and lower lens-barrier members 12, 12 are held while remaining urged to their closing direction by the torsion springs 16, 16 through the toggle levers 15, 15.

Similarly to FIGS. 11A and 11B, FIGS. 12A and 12B shows a condition where the lens barrier members 12, 12 are closed, while the ring 14 is standing ready at the intermediate position.

Figure 12A:
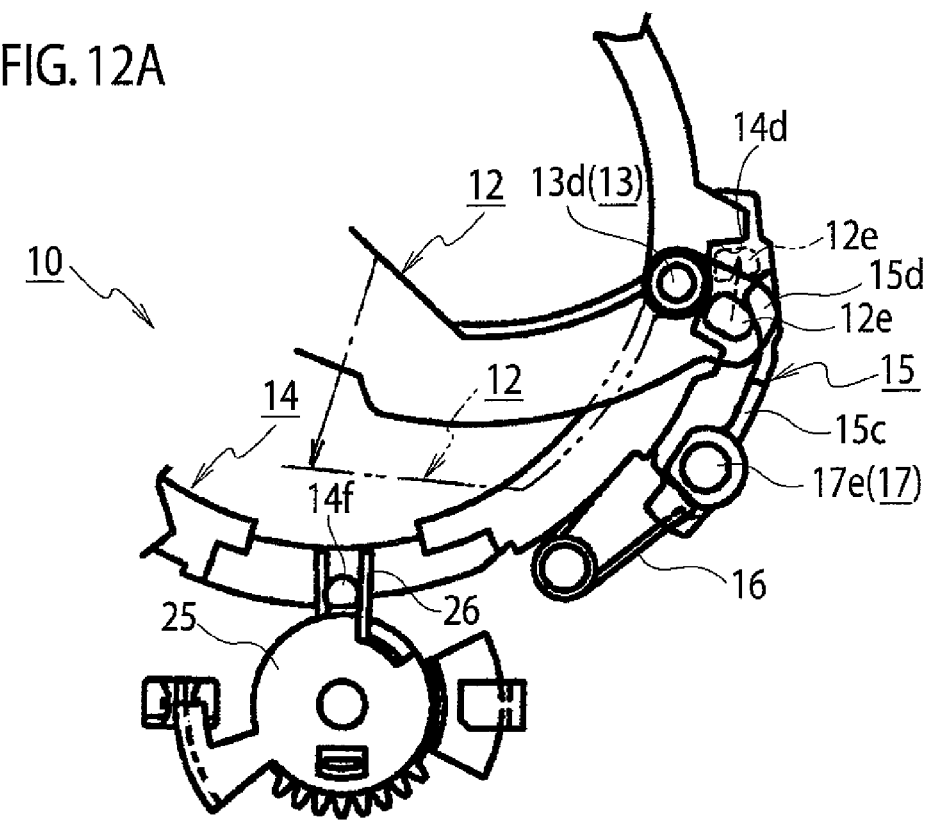
Figure 12B:
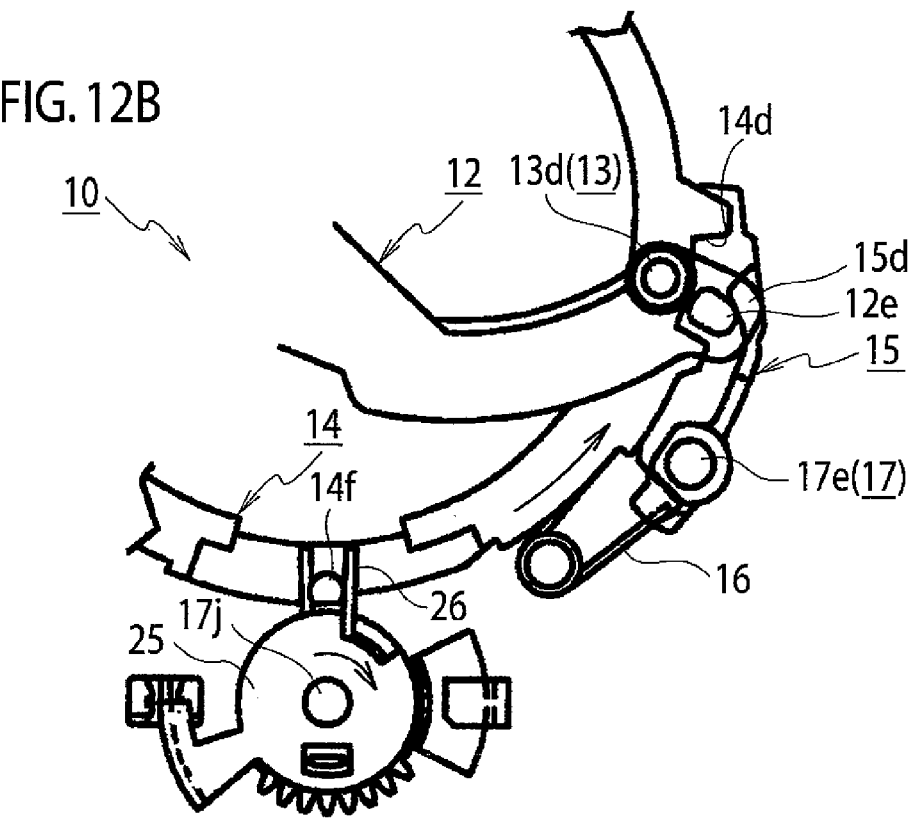

Assume here that the lens barrier device 10 has a breakdown for any reason, so that the ring 14 cannot be automatically rotated by the breeches torsion spring 26 rotating with the ring-drive toothless gear 25 integrally. In such a case, the lens barrier device 10 cannot open the lens barrier members 12, 12 automatically when taking picture of a subject. As shown in FIG. 12A, however, if a user manually rotates the lens barrier member 12 to the opening direction about the barrier support shaft 13d of the lens-barrier support frame 13 by means of e.g. tweezers, then the toggle-lever engagement boss 12e of the lens barrier member 12 can move from the one end of the recess 14d of the so-suspended ring 14 to the other end.

Under such a situation, when the toggle-lever engagement boss 12e moves from one slope of the triangular cam part 15d on the side of the sidewall part 15c to the opposite slope through a cam apex of the part 15d, the same boss 12e pushes the cam apex of the triangular cam part 15d. Consequently, while being urged by the torsion spring 16, the toggle lever 15 is firstly pivoted about the toggle-lever support shaft 17e of the base frame 17 in the clockwise direction and successively pivoted in the counter-clockwise direction. In this way, the lens barrier member 12 is opened while it is urged to its opening direction by the torsion spring 16 through the toggle lever 15.

While, in the normal state that the lens barrier device 10 has no breakdown, it is possible to automatically rotate the ring 14 through the breeches torsion spring 26 rotating with the ring-drive toothless gear 25 integrally. Thus, as shown FIG. 12B, if rotating the breeches torsion spring 26, which is hooked to the ring-drive toothless gear 25 and also engaged with the ring driving boss 14f, together with ring-drive toothless gear 25 in the clockwise direction, then the ring 14 suspended at the intermediate position begins to rotate in the direction toward the opening position (i.e. counter-clockwise direction), causing one end of the recess 14 to push the toggle-lever engagement boss 12e of the lens barrier member 12. Consequently, the lens barrier member 12 begins to rotate to its opening direction.

Figure 13A:
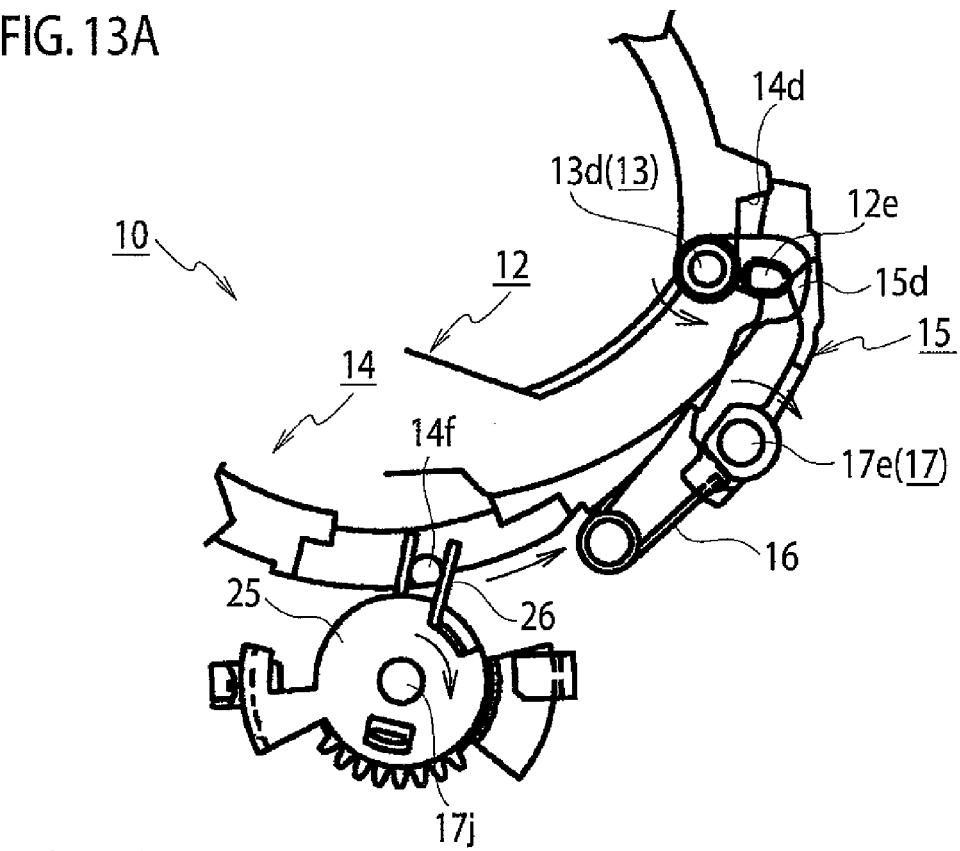
FIGS. 13A and 13B are views for explanation of the operation of the lens barrier device of the present invention, showing a condition where the lens barrier members are generally half-opened.
Figure 13B:
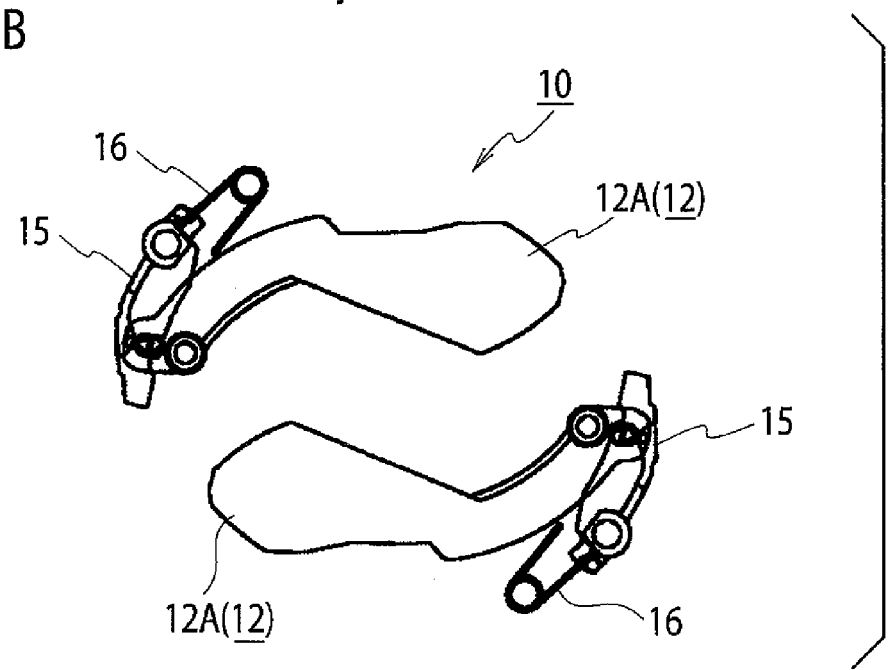

FIGS. 13A and 13B show a condition where the lens barrier members 12, 12 are opened nearly half.

Thus, as shown in FIG. 13A in enlargement, when rotating the breeches torsion spring 26 integrally with the ring-drive toothless gear 25 in the clockwise direction thereby to rotate the ring 14 in the counter-clockwise direction furthermore, one end of the recess 14d of the ring 14 operates to push the toggle-lever engagement boss 12e of the lens barrier member 12 and simultaneously, the toggle-lever engagement boss 12e also pushes the cam apex of the triangular cam part 15d of the toggle lever 15. Consequently, while opposing to the urging force of the torsion spring 16, the toggle lever 15 is pivoted about the toggle-lever support shaft 17e of the base frame 17 in the clockwise direction and additionally, the lens barrier member 12 is rotated about the barrier support shaft 13d of the lens-barrier support frame 13 to open nearly half.

In this way, the upper and lower lens barrier members 12A, 12A in pairs are opened nearly half, as shown in FIG. 13B.

Figure 14A:
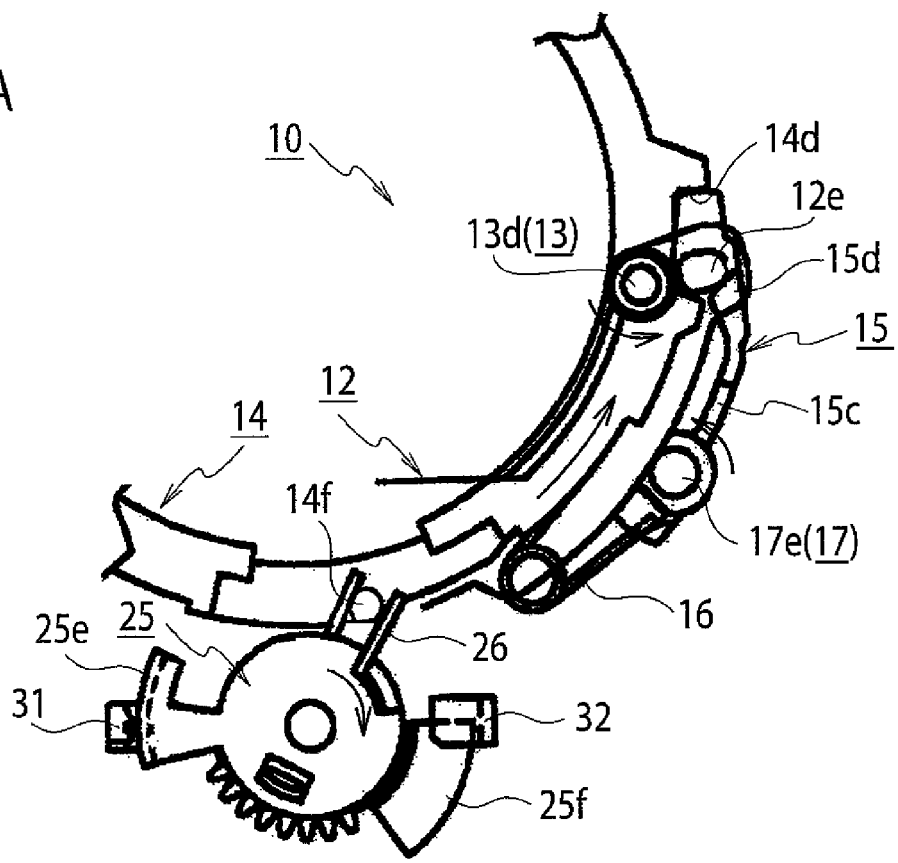
FIGS. 14A and 14B are views for explanation of the operation of the lens barrier device of the present invention, showing a condition where the lens barrier members are completely opened.
Figure 14B:
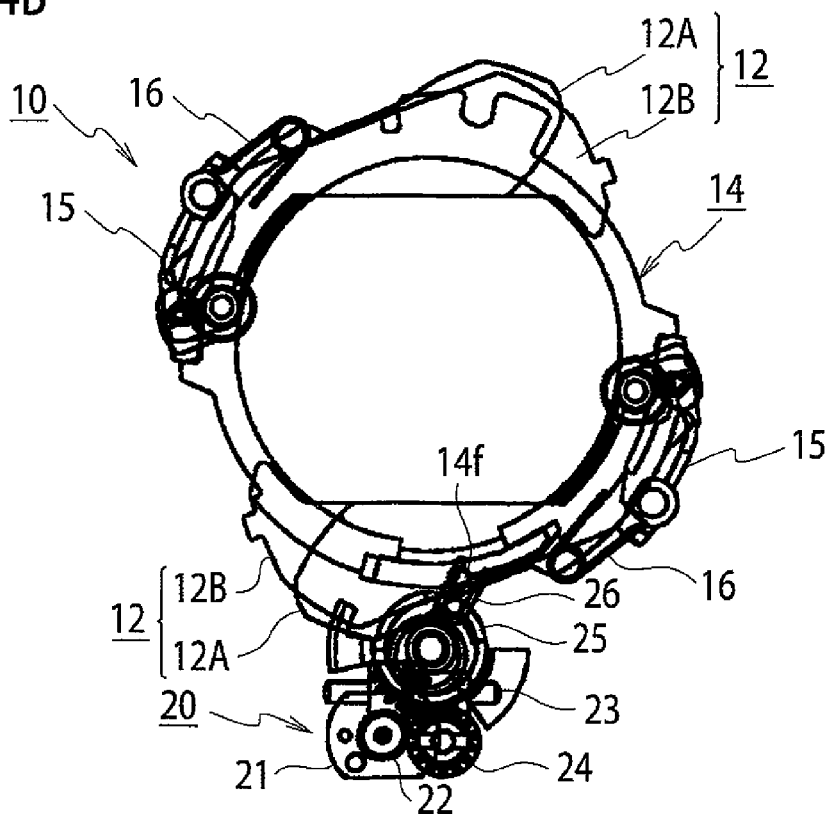

FIGS. 14A and 14B show a condition where the lens barrier members 12, 12 are opened fully.

Thus, as shown in FIG. 14A in enlargement, when further rotating the breeches torsion spring 26 integrally with the ring-drive toothless gear 25 in the clockwise direction thereby to rotate the ring 14 in the counter-clockwise direction furthermore, one end of the recess 14d of the ring 14 operates to push the toggle-lever engagement boss 12e of the lens barrier member 12 and simultaneously, the toggle-lever engagement boss 12e climbs over the cam apex of the triangular cam part 15d of the toggle lever 15 and reaches the other slope of the cam part 15d on the opposite side of the sidewall part 15e. Consequently, the toggle lever 15 is pivoted about the toggle-lever support shaft 17e of the base frame 17 in the counter-clockwise direction to urge the lens barrier member 12 to its opening direction through the torsion spring 16 and additionally, the lens barrier member 12 is rotated about the barrier support shaft 13d of the lens-barrier support frame 13 in the counter-clockwise direction to open fully.

At this time, as the first optical-sensor shielding part 25e blocks off the first optical sensor 31 while the second optical-sensor shielding part 25f does not block off the second optical sensor 32, the ring 14 comes to a standstill at the lens-barrier opening position.

Consequently, as shown in FIG. 14B, the upper and lower lens barrier members 12, 12 open completely while being urged to their opening direction by the torsion springs 16, 16 through the toggle levers 15, 15.

Subsequently, if rotating the breeches torsion spring 26 integrally with the ring-drive toothless gear 25 in reverse in the counter-clockwise direction while the lens barrier member 12 remains in its fully-opened condition, then the ring 14 is brought into the intermediate position shown in FIGS. 15A and 15B, coming to a standstill.

Figure 15A:
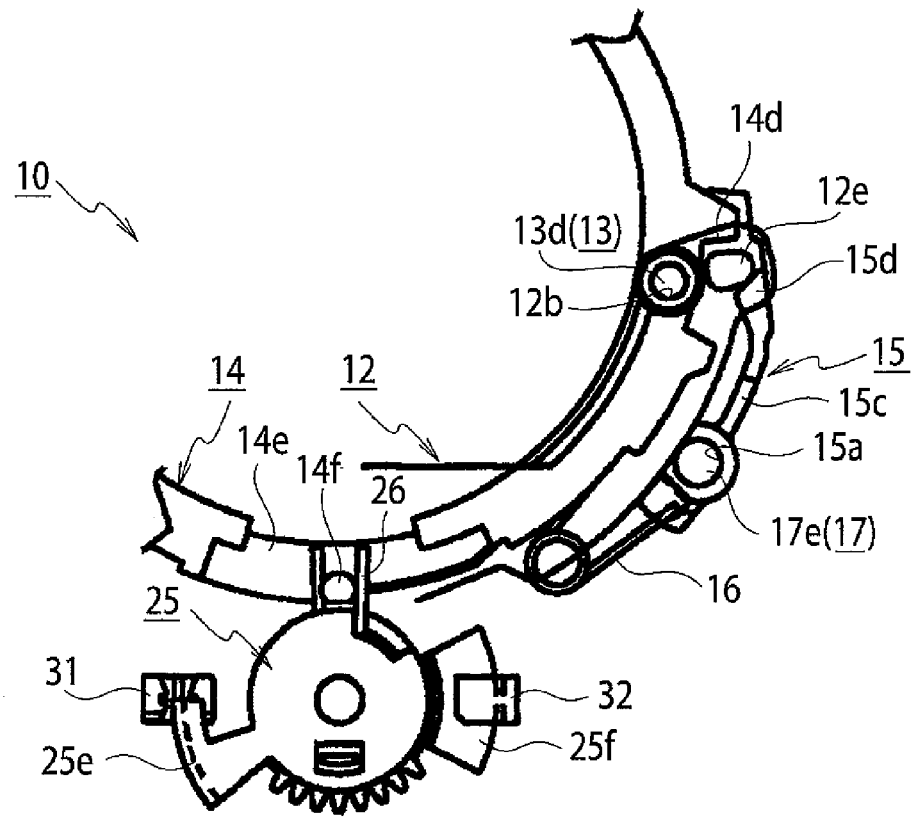
FIGS. 15A and 15B are views for explanation of the operation of the lens barrier device of the present invention, showing a condition where the lens barrier members are closed and the ring is standing by at its intermediate position.
Figure 15B:
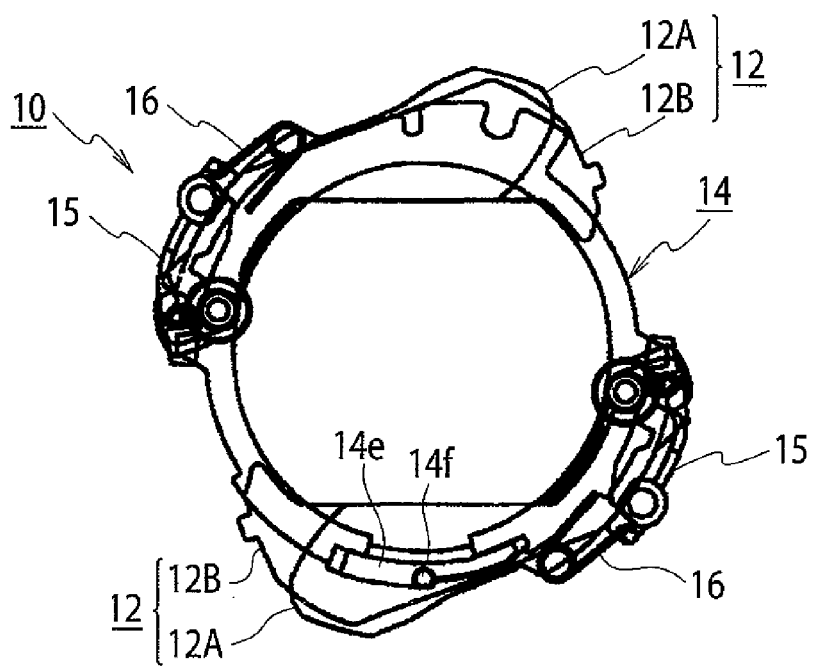

Then, FIGS. 15A and 15B shows a condition that the lens barrier members 12, 12 are opened, while the ring 15 is standing ready at the intermediate position. This condition corresponds to a state where a user is operating the video camera 1 (FIG. 1) and the lens barrier device 10 is maintained in its recording condition.

That is, as shown in FIG. 15A in enlargement, the toggle-lever engagement boss 12e of the lens barrier member 12 gets into the other slope of the triangular cam part 15d on the opposite side of the sidewall part 15c, so that the lens barrier member 12 is urged in its opening direction by the torsion spring 16 through the toggle lever 15.

On the other hand, in the ring-drive toothless gear 25, the first and second optical-sensor shielding parts 25e, 25f block off the first and second optical sensors 31, 32 respectively, while the breeches torsion spring 26 is engaged with the ring driving boss 14f at the center of the stepped part 14e of the ring 14. Nevertheless, as the ring-drive toothless gear 25 is in the resting state, the ring 14 is stopped to stand ready at the intermediate position between the lens-barrier closing position and the lens-barrier opening position. Then, the toggle-lever engagement boss 12e of the lens-barrier member 12 comes close to the other end of the recess 14d of the ring 14, on the opposite side of one end of the recess 14d closer to the ring driving boss 14f. Simultaneously, the toggle-lever engagement boss 12e is also allowed to move from the other end of the recess 14d to the one end.

Thus, as shown in FIG. 15B, the upper and lower lens-barrier members 12, 12 are held while remaining urged to their opening direction by the torsion springs 16, 16 through the toggle levers 15, 15.

Similarly to FIGS. 15A and 15B, FIGS. 16A and 16B shows a condition where the lens barrier members 12, 12 are opened, while the ring 14 is standing ready at the intermediate position.

Figure 16A:
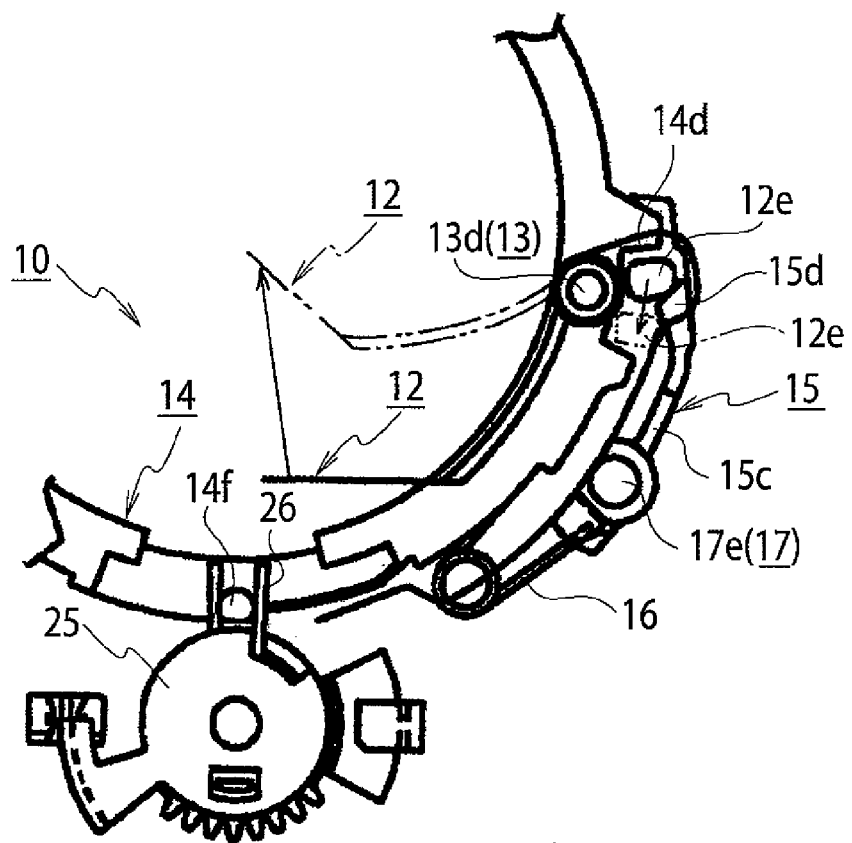
Figure 16B:
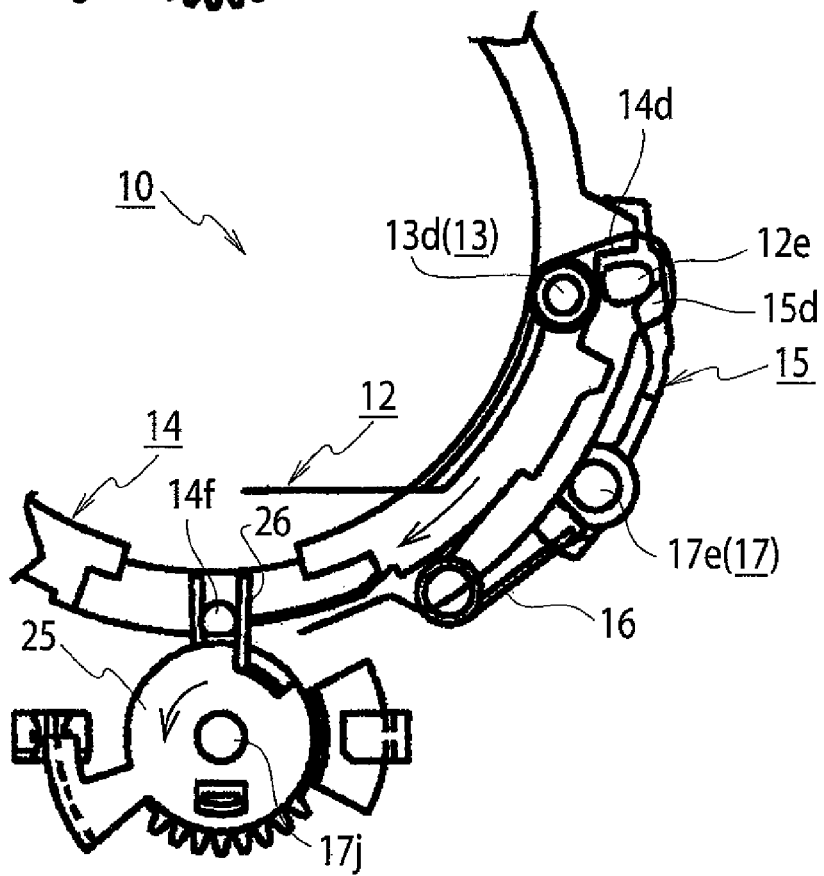

Assume here that the lens barrier device 10 has a breakdown for any reason, so that the ring 14 cannot be automatically rotated by the breeches torsion spring 26 rotating with the ring-drive toothless gear 25 integrally. In such a case, the lens barrier device 10 cannot close up the lens barrier members 12, 12 automatically after taking picture of a subject. As shown in FIG. 16A, however, if a user manually rotates the lens barrier member 12 to the closing direction about the barrier support shaft 13d of the lens-barrier support frame 13 by means of e.g. tweezers, then the toggle-lever engagement boss 12e of the lens barrier member 12 can move from the other end of the recess 14d of the so-suspended ring 14 to the one end.

Under such a situation, when the toggle-lever engagement boss 12e moves from the other slope of the triangular cam part 15d on the opposite side of the sidewall part 15c to one slope close to the sidewall part 15c through the cam apex of the part 15d, the same boss 12e pushes the cam apex of the triangular cam part 15d. Consequently, while being urged by the torsion spring 16, the toggle lever 15 is firstly pivoted about the toggle-lever support shaft 17e of the base frame 17 in the clockwise direction and successively pivoted in the counter-clockwise direction. In this way, the lens barrier member 12 is closed up while it is urged to its closing direction by the torsion spring 16 through the toggle lever 15.

While, in the normal state that the lens barrier device 10 has no breakdown, it is possible to automatically rotate the ring 14 through the breeches torsion spring 26 rotating with the ring-drive toothless gear 25 integrally. Thus, as shown FIG. 16B, if rotating the breeches torsion spring 26, which is hooked to the ring-drive toothless gear 25 and also engaged with the ring driving boss 14f, together with ring-drive toothless gear 25 in the counter-clockwise direction, then the ring 14 suspended at the intermediate position begins to rotate in the direction toward the closing position (i.e. clockwise direction), causing the other end of the recess 14 to push the toggle-lever engagement boss 12e of the lens barrier member 12. Consequently, the lens barrier member 12 begins to rotate to its closing direction.

Thereafter, though not shown in the figures, when rotating the breeches torsion spring 26 integrally with the ring-drive toothless gear 25 in the counter-clockwise direction thereby to rotate the ring 14 in the clockwise direction furthermore, the other end of the recess 14d of the ring 14 on the opposite side of one end of the recess 14d operates to push the toggle-lever engagement boss 12e of the lens barrier member 12 and simultaneously, the toggle-lever engagement boss 12e also pushes the cam apex of the triangular cam part 15d of the toggle lever 15 to open the lens barrier member 12 nearly half. Thereafter, if further rotating the breeches torsion spring 26 integrally with the ring-drive toothless gear 25 in the counter-clockwise direction thereby to rotate the ring 14 in the clockwise direction furthermore, then there can be realized a condition shown in FIGS. 17A and 17B.

Figure 17A:
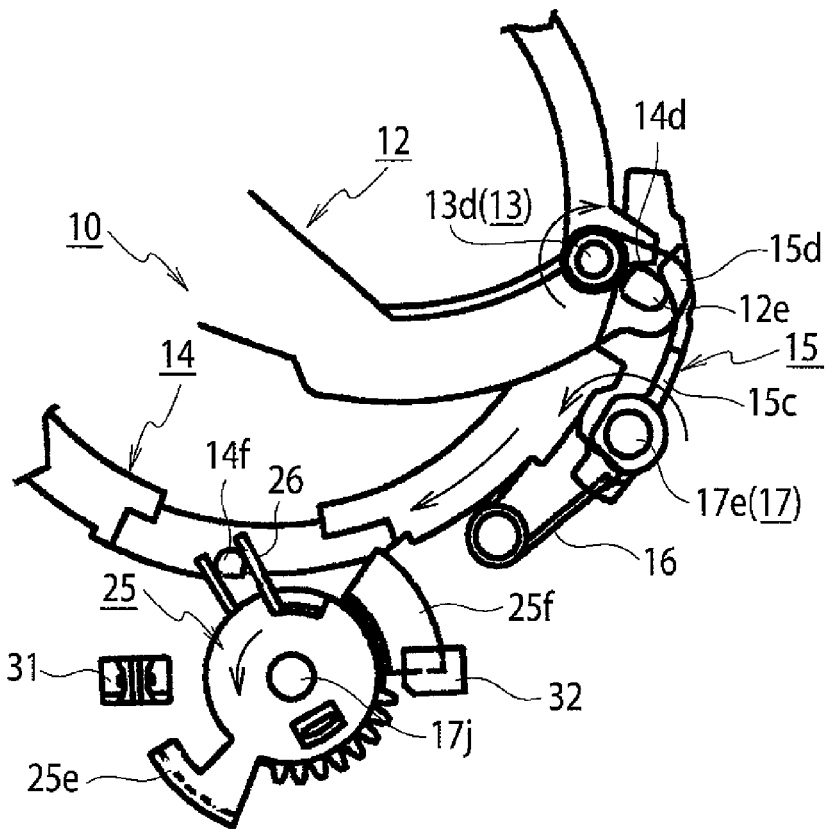
FIGS. 17A and 17B are views for explanation of the operation of the lens barrier device of the present invention, showing a condition where the lens barrier members are completely opened.
Figure 17B:
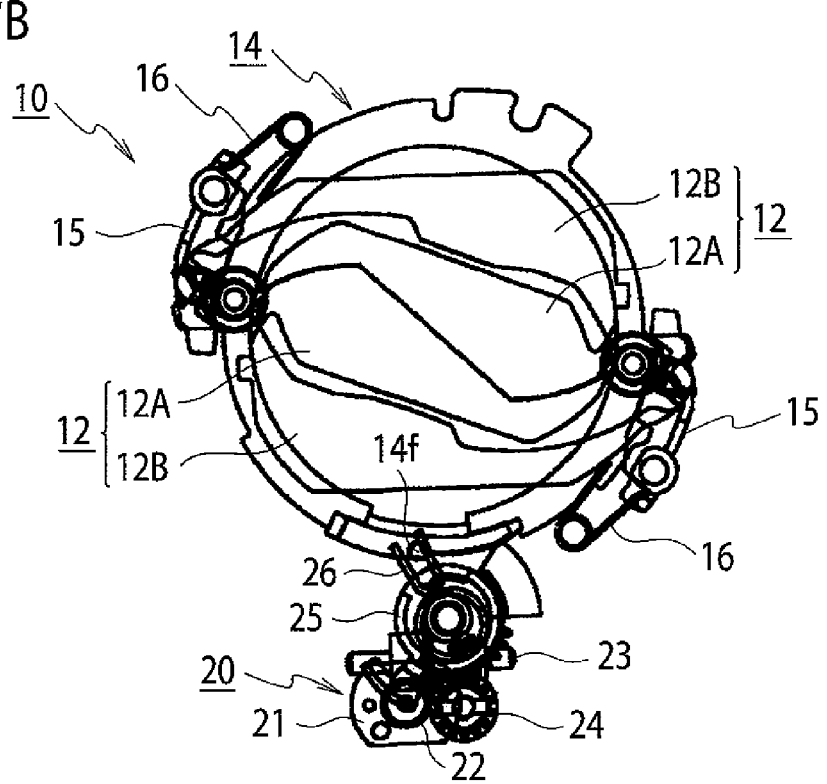

FIGS. 17A and 17B show a condition where the lens barrier members 12, 12 are closed fully.

Thus, as shown in FIG. 17A in enlargement, when further rotating the breeches torsion spring 26 integrally with the ring-drive toothless gear 25 in the counter-clockwise direction thereby to rotate the ring 14 in the clockwise direction furthermore, the other end of the recess 14d of the ring 14 operates to push the toggle-lever engagement boss 12e of the lens barrier member 12 and simultaneously, the toggle-lever engagement boss 12e climbs over the cam apex of the triangular cam part 15d of the toggle lever 15 and reaches one slope of the cam part 15d on the side of the sidewall part 15c. Consequently, the toggle lever 15 is pivoted about the toggle-lever support shaft 17e of the base frame 17 in the counter-clockwise direction to urge the lens barrier member 12 to its closing direction through the torsion spring 16 and additionally, the lens barrier member 12 is rotated about the barrier support shaft 13d of the lens-barrier support frame 13 in the clockwise direction to close up fully.

At this time, as the first optical-sensor shielding part 25e does not block off the first optical sensor 31 while the second optical-sensor shielding part 25f blocks off the second optical sensor 32, the ring 14 comes to a standstill at the lens-barrier closing position.

Consequently, as shown in FIG. 17B, the upper and lower lens barrier members 12, 12 close up completely while being urged to their closing direction by the torsion springs 16, 16 through the toggle levers 15, 15.

Subsequently, if rotating the breeches torsion spring 26 integrally with the ring-drive toothless gear 25 in reverse in the clockwise direction while the lens barrier member 12 remains closed completely, then the ring 14 is rotated in the counter-clockwise direction to return to the above-mentioned intermediate position shown in FIGS. 11A and 11B, coming to a standstill in the standby state.

According to the above-mentioned embodiment, by allowing the ring 15 to stand ready at the intermediate position between the lens-barrier closing position and the lens-barrier opening position when the upper and lower lens barrier members 12, 12 are either closed up or opened completely, the lens barrier device 10 is constructed so as to enable the pair of lens barrier members 12, 12 to be opened and closed manually as an emergency countermeasure at the operational trouble of the device 10. Nevertheless, without being limited to this operation, if only allowing the ring 14 to stand ready at the intermediate position at least when the upper and lower lens barrier members 12, 12 are closed up completely, then it is possible to manually open the pair of lens barrier members 12, 12 as the emergency countermeasure at the operational trouble of the device 10.

Further, when the upper and lower lens barrier members 12, 12 are closed up and opened completely, it is also possible to make the ring 14 remain stopped at either the lens-barrier closing position or the lens-barrier opening position without allowing the ring to stand ready at the intermediate position. Then, however, it should be noted that it is impossible to open or close the lens barrier members 12, 12 manually.

In the illustrated embodiment, the pair of lens barrier members 12, 12 are opened and closed since the motor driving source (21) in the ring drive mechanism 20 drives the forward-reverse rotatable ring 14 automatically. Without being limited to this structural form only, there may be adopted another structural form where a manual operating part extending from the outer circumferential part of the ring 14 is provided in lieu of the ring drive mechanism 20 on the base frame 17, so that the pair of lens barrier members 12, 12 can be opened and closed by manually rotating the ring 14 between the lens-barrier closing position and the lens-barrier opening position through the manual operating part.

According to the lens barrier device 10 of the present invention, repeatedly, the pair of toggle-lever engagement bosses 12e, 12e of the lens-barrier members 12, 12 are freely-fitted into the recesses 14d, 14d formed on the outer circumferential part of the ring 14. Further, with the forward-reverse rotation of the ring 14, there is realized a situation where the so-fitted bosses 12e, 12e slides along the triangular cam parts 15d, 15d, which are formed on the toggle levers 15, 15 rotatably supported by the base frame 17, while being pushed by respective ends of the recesses 14d, 14d. Therefore, by the pair of toggle levers 15, 15 and the pair of torsion springs 16, 16, it is possible to hold the upper and lower lens barrier members 12, 12 in their closed or opened condition certainly. Thus, it is possible to improve both quality and reliability of the lens barrier device 10, in comparison with the conventional device where an operating ring is formed with a cam groove for opening/closing the lens barrier members.

In addition, according to the lens barrier device 10 of the present invention, as the pair of torsion springs 16, 16 allow the pair of lens barrier members 12, 12 to be urged in their closing and opening directions through the pair of toggle levers 15, 15, it is possible to open and close up the pair of lens barrier members 12, 12 certainly.

According to the lens barrier device 10 of the present invention, as the ring 14 is forward-reverse rotated by the motor driving source (21), it is possible to automate the opening/closing operation of the pair of lens barrier members 12, 12.

Still further, the lens barrier device 10 of the present invention allows the ring 14 to stand ready at the intermediate position between the lens-barrier closing position and the lens-barrier opening position when the motor driving source (21) rotates the ring 14 to bring at least the pair of lens barrier members 12, 12 into their closing condition. Therefore, even when the lens barrier device 10 has a breakdown for any reason, it is possible to open at least the pair of lens barrier members 12, 12 manually, effecting an emergency response. Finally, it will be understood by those skilled in the art that the foregoing descriptions are nothing but one embodiment of the disclosed lens barrier device and therefore, various changes and modifications may be made within the scope of claims.

What is claimed is:

1. A lens barrier device for protecting an imaging lens from damage, comprising:
   a pair of lens barrier members each having a first shaft hole formed therein, a blade part formed on one side of the first shaft hole and a toggle-lever engagement boss formed on the other side of the first shaft hole;
   a lens-barrier support frame arranged adjacent to the pair of lens barrier members, the lens-barrier support frame having a first light through-hole defined therein and also supporting the pair of lens barrier members rotatably about the first shaft holes so that the first light through-hole is opened and closed up by the pair of lens barrier members;
   a ring arranged adjacent to the lens-barrier support frame, the ring having an outer circumferential part, a second light through-hole defined therein and a pair of recesses formed on the outer circumferential part so as to interpose the second light through-hole therebetween, the ring allowing the toggle-lever engagement bosses of the lens barrier members to be freely fitted into the recesses;
   a pair of toggle levers each having a second shaft hole formed therein and a triangular cam part formed on one side of the second shaft hole to allow the toggle-lever engagement bosses freely-fitted into the recesses to slide on the triangular cam part;
   a base frame arranged adjacent to the ring to have an outer circumferential part and a third light through-hole defined therein, the base frame supporting the ring so as to be forward-reverse rotatable between a first predetermined rotational position where the lens barrier members close up the first light through-hole and a second predetermined rotational position where the lens barrier members open the first light through-hole and also rotatably supporting the pair of toggle levers on the outer circumferential part's surface opposed to the ring so that the third light through-hole is interposed between the pair of toggle levers; and
   a pair of springs mounted on the outer circumferential part of the base frame and engaged with the pair of toggle levers respectively to urge them against the third light through-hole, wherein
   the lens-barrier support frame, the ring and the base frame are arranged so that the first light through-hole, the second light through-hole and the third light through-hole are aligned with each other, and
   the sliding movement of the toggle-lever engagement bosses on the triangular cam part while being pressed by respective ends of the recesses, which movement is caused by forward-reverse rotating the ring between the first predetermined rotational position and the second predetermined rotational position, allows the pair of lens barrier members to remain either closed or opened by the pair of toggle levers and the pair of springs.

2. The lens barrier device of claim 1, wherein
   the pair of springs are adapted so as to urge the pair of lens barrier members in a direction to close up the first light through-hole through the pair of toggle levers when the toggle-lever engagement bosses are positioned on one slope forming the triangular cam part and to urge the pair of lens barrier members in a direction to open the first light through-hole through the pair of toggle levers when the toggle-lever engagement bosses are positioned on the other slope forming the triangular cam part.

3. The lens barrier device of claim 1, further comprising a motor driving source, wherein the ring is forward-reverse rotated by the motor driving source.

4. The lens barrier device of claim 3, wherein the motor driving source comprises a DC motor mounted on the base frame.

5. The lens barrier device of claim 3, wherein when the motor driving source rotates the ring so that the lens barrier members in pairs are rotated to close up the first light throughhole, the ring is standing ready at an intermediate rotational position between the first predetermined rotational position and the second predetermined rotational position.

6. The lens barrier device of claim 3, further comprising a ring drive mechanism for forward-reverse rotating the ring, wherein the ring drive mechanism comprises:
   the motor driving source;
   a ring driving boss formed on the our circumferential part of the ring;
   a decelerating gear system consisting of a plurality of gears associated with the motor driving source; and
   a breeches torsion spring integrally hooked to one gear in a final stage of the decelerating gear system, which is forward-reverse rotatable within a predetermined angular range, the breeches torsion spring having a pair of breech parts engaged with the ring driving boss.

7. The lens barrier device of claim 6, wherein the one gear in the final stage of the decelerating gear system is a toothless gear having some gear teeth eliminated.

8. The lens barrier device of claim 1, wherein the pair of springs comprise a pair of torsion springs, each of which has a ring part and two extended ends extending from the ring part, one of the extended ends being engaged with the toggle lever and the other of the extended ends being engaged with the base frame.

* * * * *